(12) United States Patent
Tate et al.

(10) Patent No.: US 12,362,437 B2
(45) Date of Patent: Jul. 15, 2025

(54) MULTILAYERED FLEXIBLE INTERCONNECT CIRCUITS FOR BATTERY ASSEMBLIES AND METHODS OF FABRICATING AND INSTALLING THEREOF

(71) Applicant: CelLink Corporation, San Carlos, CA (US)

(72) Inventors: Gabrielle Tate, Royal Oak, MI (US); Jean-Paul Ortiz, White Lake, MI (US); Will Findlay, San Carlos, CA (US)

(73) Assignee: CelLink Corporation, San Carlos, CA (US)

( * ) Notice: Subject to any disclaimer, the term of this patent is extended or adjusted under 35 U.S.C. 154(b) by 0 days.

(21) Appl. No.: 18/924,233

(22) Filed: Oct. 23, 2024

(65) Prior Publication Data

US 2025/0158241 A1 May 15, 2025

Related U.S. Application Data

(60) Provisional application No. 63/598,212, filed on Nov. 13, 2023.

(51) Int. Cl.
*H02G 5/00* (2006.01)
*H01M 10/613* (2014.01)
(Continued)

(52) U.S. Cl.
CPC ....... *H01M 50/526* (2021.01); *H01M 10/613* (2015.04); *H01M 10/6551* (2015.04);
(Continued)

(58) Field of Classification Search
CPC ........... H01M 10/613; H01M 10/6551; H01M 50/256; H01M 50/507; H01M 50/524;
(Continued)

(56) References Cited

U.S. PATENT DOCUMENTS 3,750,278 A   8/1973   Baker et al.
4,818,840 A   4/1989   Booth et al.
(Continued)

FOREIGN PATENT DOCUMENTS

CN   203715762 U   7/2014
EP     3496180 A1   6/2019
(Continued)

OTHER PUBLICATIONS

Nagarajan Palavesam et al; "Roll-to-roll processing of film substrates for hybrid integrated flexible electronics" Flexible and Printed Electronics, Feb. 2018.

*Primary Examiner* — Timothy J Thompson
*Assistant Examiner* — Guillermo J Egoavil
(74) *Attorney, Agent, or Firm* — Polygon IP, LLP

(57) ABSTRACT

Provided are multilayered flexible interconnect circuits comprising multiple conductive layers. Also provided are methods of fabricating such circuits and also methods of fabricating battery assemblies with such circuits. A multilayered flexible interconnect circuit comprises at least two conductive layers and at least one inner insulator, which extends between these conductive layers in some circuit portions and allows for conductive layers to directly interface in other circuit portions (e.g., busbar portions). Outer insulators can be provided to insulate these conductive layers from the environment while allowing some access to these layers as needed. Each conductive layer and insulator can be individually patterned to achieve these functions. One or more insulators support conductive layers relative to each other as well as different portions (e.g., disjoined portions) of the same conductive layer. The same multilayered flexible interconnect circuit can provide battery interconnect, voltage/temperature sense, and/or other functions.

20 Claims, 14 Drawing Sheets

(51) Int. Cl.
  *H01M 10/6551* (2014.01)
  *H01M 50/507* (2021.01)
  *H01M 50/524* (2021.01)
  *H01M 50/526* (2021.01)

(52) U.S. Cl.
  CPC ....... *H01M 50/507* (2021.01); *H01M 50/524* (2021.01); *H02G 5/005* (2013.01)

(58) Field of Classification Search
  CPC ........... H01M 10/643; H01M 10/6566; H01M 50/204; H01M 50/213; H01M 50/284; H01M 50/289; H01M 50/30; H01M 50/35; H01M 50/358; H01M 50/367; H01M 50/383; H01M 50/502; H01M 50/505; H01M 50/512; H01M 50/522; H02G 5/005; H02G 5/00
  USPC .......................................... 174/68.2; 429/82
  See application file for complete search history.

(56) References Cited

U.S. PATENT DOCUMENTS

| | | | |
|---|---|---|---|
| 5,262,594 | A | 11/1993 | Edwin et al. |
| 5,645,932 | A | 7/1997 | Uchibori |
| 6,010,771 | A | 1/2000 | Isen et al. |
| 6,036,809 | A | 3/2000 | Kelly et al. |
| 6,332,909 | B1 | 12/2001 | Teshima et al. |
| 6,787,732 | B1 | 9/2004 | Xuan et al. |
| 6,881,923 | B2 | 4/2005 | Battaglia |
| 6,992,001 | B1 | 1/2006 | Lin |
| 7,497,004 | B2 | 3/2009 | Cote et al. |
| 7,633,035 | B2 | 12/2009 | Kirmeier |
| 8,510,934 | B2 | 8/2013 | Brand et al. |
| 8,931,166 | B2 | 1/2015 | Marttila |
| 9,214,607 | B1 | 12/2015 | Andrews |
| 9,671,352 | B2 | 6/2017 | Woo et al. |
| 9,692,030 | B2 | 6/2017 | Schüssler et al. |
| 9,730,333 | B2 | 8/2017 | Li et al. |
| 10,008,403 | B2 | 6/2018 | Rumsby et al. |
| 10,842,025 | B1 | 11/2020 | Lane |
| 2001/0006766 | A1 | 7/2001 | O'Brien et al. |
| 2002/0046856 | A1 | 4/2002 | Alcoe |
| 2002/0050489 | A1 | 5/2002 | Ikegami et al. |
| 2003/0062347 | A1 | 4/2003 | Song et al. |
| 2006/0032665 | A1 | 2/2006 | Ice |
| 2007/0171129 | A1 | 7/2007 | Coleman et al. |
| 2007/0193027 | A1 | 8/2007 | Takakusaki et al. |
| 2008/0017971 | A1 | 1/2008 | Hollis |
| 2008/0083715 | A1 | 4/2008 | Kirmeier |
| 2008/0128397 | A1 | 6/2008 | Gandhi |
| 2009/0007421 | A1 | 1/2009 | Chen et al. |
| 2010/0031996 | A1 | 2/2010 | Basol |
| 2011/0001670 | A1 | 1/2011 | Coleman et al. |
| 2011/0089212 | A1 | 4/2011 | Schmid et al. |
| 2012/0164490 | A1* | 6/2012 | Itoi ..................... H01M 50/358 429/82 |
| 2012/0171527 | A1 | 7/2012 | Hiroma |
| 2012/0227907 | A1 | 9/2012 | Arakawa et al. |
| 2013/0055555 | A1 | 3/2013 | Forster et al. |
| 2013/0260191 | A1 | 10/2013 | Takahashi et al. |
| 2014/0268780 | A1 | 9/2014 | Wang et al. |
| 2015/0023584 | A1 | 1/2015 | Rudin |
| 2015/0228956 | A1 | 8/2015 | Schüssler et al. |
| 2015/0270190 | A1 | 9/2015 | Kim et al. |
| 2016/0181579 | A1 | 6/2016 | Geshi et al. |
| 2016/0207287 | A1 | 7/2016 | Kim |
| 2016/0315304 | A1 | 10/2016 | Biskup |
| 2016/0366768 | A1 | 12/2016 | Matsuda |
| 2017/0012331 | A1 | 1/2017 | Ng et al. |
| 2017/0214033 | A1 | 7/2017 | Takano et al. |
| 2018/0034023 | A1 | 2/2018 | Newman et al. |
| 2018/0205048 | A1 | 7/2018 | Enomoto et al. |
| 2018/0294536 | A1 | 10/2018 | Kruszelnicki |
| 2019/0097204 | A1 | 3/2019 | Liposky et al. |
| 2019/0181419 | A1 | 6/2019 | Suba et al. |
| 2019/0296281 | A1 | 9/2019 | Elsberry |
| 2019/0312251 | A1 | 10/2019 | Matthews |
| 2019/0341585 | A1 | 11/2019 | Shi et al. |
| 2020/0220120 | A1 | 7/2020 | Day et al. |
| 2021/0066683 | A1 | 3/2021 | Lane |
| 2021/0086306 | A1 | 3/2021 | Lane |
| 2021/0091363 | A1 | 3/2021 | Lane |
| 2021/0092853 | A1 | 3/2021 | Lane |
| 2021/0092854 | A1 | 4/2021 | Lane |
| 2021/0092837 | A1 | 6/2021 | Lane |
| 2021/0092851 | A1 | 6/2021 | Lane |

FOREIGN PATENT DOCUMENTS

| | | |
|---|---|---|
| KR | 20150058939 A | 5/2015 |
| WO | 2019150740 A1 | 8/2019 |

* cited by examiner

MULTILAYERED FLEXIBLE INTERCONNECT CIRCUITS FOR BATTERY ASSEMBLIES AND METHODS OF FABRICATING AND INSTALLING THEREOF

CROSS-REFERENCE TO RELATED APPLICATIONS

This application claims the benefit under 35 U.S.C. § 119 (e) of U.S. Provisional Patent Application 63/598,212 by Tate, et. al., entitled: "Multilayered Flexible Interconnect Circuits for Battery Assemblies and Methods of Fabricating and Installing Thereof", filed on 2023 Nov. 13, which is incorporated herein by reference in its entirety for all purposes.

BACKGROUND

Battery cells in battery packs and other types of battery assemblies are typically interconnected using individual busbars. Each busbar is stamped from a sufficiently thick metal sheet (selected based on current ratings) and individually handled during the busbar installation (e.g., positioned over and welded to the battery terminals). Furthermore, additional circuits (e.g., voltage sense harnesses) can be installed and connected to these busbars during the battery pack fabrication. Overall, many different operations and components are used, which complicates the fabrication process.

What is needed are new circuit types, such as multilayered flexible interconnect circuits, that overcome various challenges associated with conventional busbars.

SUMMARY

Provided are multilayered flexible interconnect circuits comprising multiple conductive layers. Also provided are methods of fabricating such circuits and also methods of fabricating battery assemblies with such circuits. A multilayered flexible interconnect circuit comprises at least two conductive layers and at least one inner insulator, which extends between these conductive layers in some circuit portions and allows for conductive layers to directly interface in other circuit portions (e.g., busbar portions). Outer insulators can be provided to insulate these conductive layers from the environment while allowing some access to these layers as needed. Each conductive layer and insulator can be individually patterned to achieve these functions. One or more insulators support conductive layers relative to each other as well as different portions (e.g., disjoined portions) of the same conductive layer. The same multilayered flexible interconnect circuit can provide battery interconnect, voltage/temperature sense, and/or other functions.

Clause 1. A multilayered flexible interconnect circuit comprising: a first outer insulator layer; a second outer insulator layer; an inner insulator layer; a first conductive layer; and a second conductive layer, wherein: the first outer insulator layer, the second outer insulator layer, the inner insulator layer, the first conductive layer, and the second conductive layer collectively define a busbar portion, a busbar support portion, an insulated conductor portion, and a metal-free portion of the flexible interconnect circuit, in the busbar portion, the first conductive layer and the second conductive layer directly interface with each other while a surface of the first conductive layer facing away from the second conductive layer is exposed, in the busbar support portion, the inner insulator layer is stacked between and directly interfaces each of the first conductive layer and the second conductive layer, in the busbar support portion, the first conductive layer is stacked between and directly interfaces the first outer insulator layer and the inner insulator layer, and in the busbar support portion, the second conductive layer is stacked between and directly interfaces the inner insulator layer and the second outer insulator layer.

Clause 2. The multilayered flexible interconnect circuit of clause 1, wherein, in the metal-free portion, the inner insulator layer is stacked between and directly interfaces the first outer insulator layer and the second outer insulator layer.

Clause 3. The multilayered flexible interconnect circuit of clause 2, wherein, in the insulated conductor portion: the second conductive layer is stacked between and directly interfaces the inner insulator layer and the second outer insulator layer, and the inner insulator layer is stacked between and directly interfaces the second conductive layer and the first outer insulator layer.

Clause 4. The multilayered flexible interconnect circuit of clause 3, wherein the insulated conductor portion is positioned between the busbar support portion and metal-free portion.

Clause 5. The multilayered flexible interconnect circuit of clause 1, wherein the busbar support portion at least partially surrounds the busbar portion.

Clause 6. The multilayered flexible interconnect circuit of clause 1, wherein the busbar support portion is positioned between the busbar portion and the metal-free portion.

Clause 7. The multilayered flexible interconnect circuit of clause 1, wherein each of the first outer insulator layer, the second outer insulator layer, the inner insulator layer, the first conductive layer, and the second conductive layer is formed from a same starting sheet.

Clause 8. The multilayered flexible interconnect circuit of clause 1, wherein each of the first outer insulator layer, the second outer insulator layer, the inner insulator layer, the first conductive layer, and the second conductive layer has the same thickness and composition throughout an entire footprint of the flexible interconnect circuit.

Clause 9. The multilayered flexible interconnect circuit of clause 1, wherein each of the first outer insulator layer, the second outer insulator layer, and the inner insulator layer has an opening in the busbar portion.

Clause 10. The multilayered flexible interconnect circuit of clause 1, wherein: each of the first outer insulator layer and the second outer insulator layer comprises a polymer base and an adhesive layer covering a surface of and supported by the polymer base, the polymer base comprises one or more polymers selected from the group consisting of polyimide (PI), polyethylene naphthalate (PEN), polyethylene terephthalate (PET), polymethyl methacrylate (PMMA), ethyl vinyl acetate (EVA), polyethylene (PE), polyvinyl fluoride (PVF), polyamide (PA), and/or polyvinyl butyral (PVB), and the adhesive layer comprises one or more of epoxy and polyurethane.

Clause 11. The multilayered flexible interconnect circuit of clause 10, wherein, in the busbar support portion: the adhesive layer of the first outer insulator layer directly interfaces and is adhered to the first conductive layer, and the adhesive layer of the second outer insulator layer directly interfaces and is adhered to the second conductive layer.

Clause 12. The multilayered flexible interconnect circuit of clause 1, wherein: the inner insulator layer comprises an inner polymer base, a first inner adhesive layer, and a second inner adhesive layer, the inner polymer base is positioned between and supports each of the first inner adhesive layer and the second inner adhesive layer, the inner polymer base comprises one or more polymers selected from the group consisting of polyimide (PI), polyethylene naphthalate (PEN), polyethylene terephthalate (PET), polymethyl methacrylate (PMMA), ethyl vinyl acetate (EVA), polyethylene (PE), polyvinyl fluoride (PVF), polyamide (PA), and/or polyvinyl butyral (PVB), and each of the first inner adhesive layer and the second inner adhesive layer comprises one or more of epoxy and polyurethane.

Clause 13. The multilayered flexible interconnect circuit of clause 12, wherein, in the busbar support portion: the first inner adhesive layer of the inner insulator layer directly interfaces and is adhered to the first conductive layer, and the adhesive layer of the second outer insulator layer directly interfaces and is adhered to the second conductive layer.

Clause 14. The multilayered flexible interconnect circuit of clause 1, wherein each of the first conductive layer and the second conductive layer comprises aluminum and has a thickness of 100-400 micrometers.

Clause 15. The multilayered flexible interconnect circuit of clause 1, further comprising a support unit adhered to the first outer insulator layer and comprises a busbar access opening such that the busbar portion fully overlaps with the support unit.

Clause 16. The multilayered flexible interconnect circuit of clause 1, wherein the first outer insulator layer and second outer insulator layer comprise a set of flexibility slits in the metal-free portion surrounding the busbar support portion thereby providing out-of-plane flexibility of the busbar portion.

Clause 17. The multilayered flexible interconnect circuit of clause 1, further comprising a registration portion comprising: a first registration opening in the second outer insulator layer; and a second registration opening in the second conductive layer, wherein: a dimension of the first registration opening in a direction is larger than a dimension of the second registration opening in the same direction, the first registration opening and the second registration opening are aligned, a portion of the second conductive layer is visible through the first registration opening, and a portion of an insulator layer other than the second outer insulator layer is visible through the second registration opening.

Clause 18. The multilayered flexible interconnect circuit of clause 17, wherein the portion of an insulator layer other than the second outer insulator layer visible through the second registration opening is a portion of the inner insulator layer.

Clause 19. The multilayered flexible interconnect circuit of clause 1, further comprising at least one high-current conductor electrically unconnected with any of the busbars and comprising at least two conductive layers that directly interface one another.

Clause 20. The multilayered flexible interconnect circuit of clause 19, wherein the high-current conductor comprises at least one heatsink portion and at least one intersink portion, wherein: the heatsink portion and intersink portion are monolithic, the heatsink portion extends further in a width than the intersink portion, and a ratio of an extension of the heatsink portion in the width to an extension of the intersink portion in the same direction is at least 10:1.

Clause 21. A battery assembly comprising: a set of battery cells comprising cell terminals; and a multilayered flexible interconnect circuit comprising a first outer insulator layer, a second outer insulator layer, an inner insulator layer, a first conductive layer, and a second conductive layer, wherein: the first outer insulator layer, the second outer insulator layer, the inner insulator layer, the first conductive layer, and the second conductive layer collectively define a busbar portion, a busbar support portion, an insulated conductor portion, and a metal-free portion of the flexible interconnect circuit, in the busbar portion, the first conductive layer and the second conductive layer directly interface with each other, and both are welded to the cell terminals of two adjacent battery cells of the set of battery cells, in the busbar portion, a surface of the first conductive layer facing away from the second conductive layer interfaces with the cell terminals of the two adjacent battery cells of the set of battery cells, in the busbar support portion, the inner insulator layer is stacked between and directly interfaces the first conductive layer and the second conductive layer, in the busbar support portion, the first conductive layer is stacked between and directly interfaces the first outer insulator layer and the inner insulator layer, and in the busbar support portion, the second conductive layer is stacked between and directly interfaces the inner insulator layer and the second outer insulator layer.

Clause 22. The battery assembly of clause 21, wherein the busbar portion is positioned out of plane relative to other portions of the multilayered flexible interconnect circuit and closer to the cell terminals than the metal-free portion.

Clause 23. The battery assembly of clause 21, wherein in the busbar portion the first outer insulator layer comprises an opening that exposes the surface of the first conductive layer facing away from the second conductive layer.

Clause 24. The battery assembly of clause 23, wherein in the busbar portion the second outer insulator layer comprises an opening that exposes the surface of the second conductive layer facing away from the first conductive layer.

Clause 25. The battery assembly of clause 21, wherein: the two battery cells are shifted out-of-plane relative to each other, and within the busbar portion the busbar is deflected out-of-plane relative to other portions of the multilayered flexible interconnect circuit and the welds are positioned out-of-plane relative to each other.

Clause 26. The battery assembly of clause 21, further comprising a vent-channel forming metal portion, wherein: the vent-channel forming metal portion is formed from one or both of the first conductive layer and the second conductive layer, the vent-channel forming metal portion is electrically unconnected to the busbars, and the vent-channel forming metal portion is positioned over and aligned with vent plugs of the battery cells.

Clause 27. The battery assembly of clause 26, wherein the vent-channel forming metal portion is a single monolithic strip.

Clause 28. The battery assembly of clause 26, wherein the vent-channel forming metal portion is patterned into multiple strips, thereby increasing an out-of-plane flexibility of the vent-channel forming metal portion.

Clause 29. The battery assembly of clause 21, wherein the multilayered flexible interconnect circuit further comprises a support unit adhered to the first outer insulator layer, wherein: the support unit comprises a busbar access opening such that the busbar portion fully overlaps with the busbar access opening, the support unit is positioned between the first outer insulator layer and battery cells, and the busbar is deflected out-of-plane relative to other portions of the multilayered flexible interconnect circuit and towards the cell terminals when the busbar is welded to the cell terminals.

Clause 30. The battery assembly of clause 29, wherein the support unit is bonded to the first outer insulator layer.

Clause 31. A method of fabricating a multilayered flexible interconnect circuit, the method comprising: laminating a first metal sheet to a first temporary substrate; patterning the first metal sheet, while laminated to the first temporary substrate, thereby forming a first conductive layer; laminating a second metal sheet to a second temporary substrate; patterning the second metal sheet, while the laminated to the second temporary substrate, thereby forming a second conductive layer; and stack and laminate the first conductive layer, the second conductive layer, a first outer insulator layer, a second outer insulator layer, and an inner insulator layer thereby forming the flexible interconnect circuit, wherein: the multilayered flexible interconnect circuit is defined by a busbar portion, a busbar support portion, an insulated conductor portion, and a metal-free portion of the flexible interconnect circuit, in the busbar portion, the first conductive layer and the second conductive layer directly interface with each other while a surface of the first conductive layer facing away from the second conductive layer is exposed, in the busbar support portion, an inner insulator layer is stacked between and directly interfaces the first conductive layer and the second conductive layer, in the busbar support portion, the first conductive layer is stacked between and directly interfaces the first outer insulator layer and the inner insulator layer, and in the busbar support portion, the second conductive layer is stacked between and directly interfaces the inner insulator layer and the second outer insulator layer.

Clause 32. A method of fabricating a battery assembly, the method comprising: positioning a multilayered flexible interconnect circuit over a set of battery cells comprising cell terminals, wherein: the multilayered flexible interconnect circuit comprises a first outer insulator layer, a second outer insulator layer, an inner insulator layer, a first conductive layer, and a second conductive layer, the first outer insulator layer, the second outer insulator layer, the inner insulator layer, the first conductive layer, and the second conductive layer collectively define a busbar portion, a busbar support portion, an insulated conductor portion, and a metal-free portion of the flexible interconnect circuit, in the busbar portion, the first conductive layer and the second conductive layer directly interface with each other while a surface of the first conductive layer facing away from the second conductive layer is exposed, in the busbar support portion, the inner insulator layer is stacked between and directly interfaces each of the first conductive layer and the second conductive layer, in the busbar support portion, the first conductive layer is stacked between and directly interfaces the first outer insulator layer and the inner insulator layer, and in the busbar support portion, the second conductive layer is stacked between and directly interfaces the inner insulator layer and the second outer insulator layer; pushing the busbar portion toward the cell terminals to establish a direct contact between the first conductive layer in the busbar portion and the cell terminals; and welding the first conductive layer in the busbar portion to the cell terminals.

Clause 33. The method of clause 32, wherein the multilayered flexible interconnect circuit further comprises at least one alignment feature thereby enabling the alignment of the multilayered flexible interconnect circuit with the battery cells such that the busbar portions of the multilayered flexible interconnect circuit are positioned over the cell terminals of the battery cells.

Clause 34. The method of clause 33, wherein the alignment feature comprises: a first registration opening in the second outer insulator layer; and a second registration opening in the second conductive layer, wherein: a dimension of the first registration opening in a direction is larger than a dimension of the second registration opening in the same direction, the first registration opening and the second registration opening are aligned, a portion of the second conductive layer is visible through the first registration opening, and a portion of an insulator layer other than the second outer insulator layer is visible through the second registration opening.

Clause 35. The method of clause 32, wherein during pushing of the busbar portion toward the cell terminals the busbar portion is deflected out-of-plane relative to other portions of the multilayered flexible interconnect circuit.

Clause 36. The method of clause 32, wherein when the first conductive layer is welded to the cell terminals, the second conductive layer in the busbar portion is also welded to the first conductive layer.

Clause 37. The method of clause 32, further comprising positioning a support unit between the first outer insulator layer and the battery cells prior to pushing the busbar portion toward the cell terminals.

Clause 38. The method of clause 37, further comprising bonding the support unit to the with an adhesive prior to pushing the busbar portion toward the cell terminals.

Clause 39. The method of clause 32, wherein the multilayered flexible interconnect circuit further comprises vent-channel forming metal portions formed from one or both of the first conductive layer and the second conductive layer and positioned over and aligned with vent plugs of the battery cells when the multilayered flexible interconnect circuit is positioned over the set of battery cells.

Clause 40. The method of clause 39, further comprising shaping the vent-channel forming metal portions to form a vent channel over the vent plugs after positioning the over the set of battery cells.

Clause 41. The method of clause 40, wherein: the vent-channel forming metal portions is formed by multiple strips, and one or both outer insulator layers has perforations, thereby increasing its out-of-plane flexibility.

These and other embodiments are described further below with reference to the figures.

BRIEF DESCRIPTION OF THE DRAWINGS

The included drawings are for illustrative purposes and serve only to provide examples of possible structures and operations for the disclosed inventive systems, apparatus, and methods. These drawings in no way limit any changes in form and detail that may be made by one skilled in the art without departing from the spirit and scope of the disclosed implementations.

DETAILED DESCRIPTION

Figure 1A:
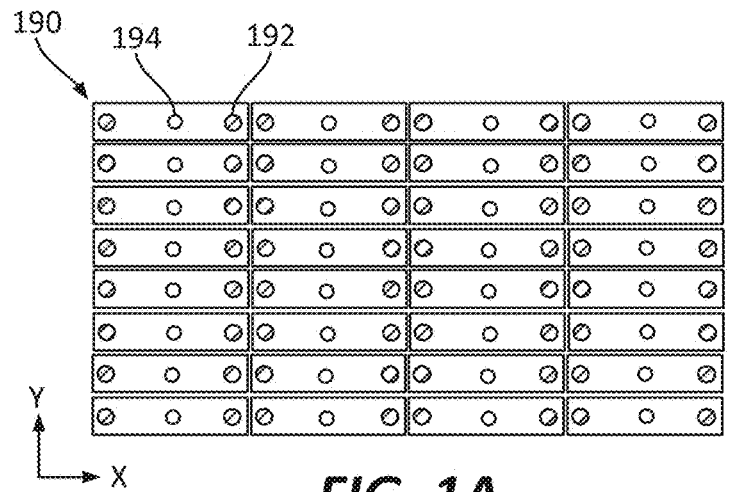
FIG. 1A is a top view of a set of prismatic battery cells illustrating cell terminals and vent plugs of these cells, in accordance with some examples.

In the following description, numerous specific details are outlined to provide a thorough understanding of the presented concepts. In some examples, the presented concepts are practiced without some or all of these specific details. In other examples, well-known process operations have not been described in detail to unnecessarily obscure the described concepts. While some concepts will be described in conjunction with specific examples, it will be understood that these examples are not intended to be limiting.

Flexible interconnect circuits are used to deliver power and/or signals and are used for various applications, such as vehicles, appliances, electronics, and the like. One example of such flexible interconnect circuits is a harness. As noted above, a conventional harness uses a stranded set of small round wires. A separate polymer shell insulates each wire, adding to the size and weight of the harness. Unlike conventional harnesses, flexible interconnect circuits described herein have thin flat profiles, enabled by thin electrical conductors that can be positioned side-by-side. Each electrical conductor can have a flat rectangular profile. In some examples, electrical conductors (positioned next to each other) are formed from the same metal sheet (e.g., foil). For purposes of this disclosure, the term "interconnect" is used interchangeably with "flexible interconnect circuit", the term "conductive layer"—with "conductor" or "conductor layer", and the term "insulating layer"—with "insulator".

INTRODUCTION

As noted above, conventional busbars used for connecting battery cells are typically used as individual components stamped from thick metal sheets to ensure sufficient current capabilities. However, this individual component aspect complicates the battery pack assembly process, e.g., requiring individual handling and alignment of each component. Furthermore, these thick metal sheets may not be sufficiently flexible to accommodate various alignment deviations among battery cells, which further complicates the installation process. Finally, various additional components (besides battery cells, e.g., voltage-sense harnesses) need to be connected to busbars adding even more operational complexities.

Multilayered flexible interconnect circuits described herein address various issues listed above. Specifically, a multilayered flexible interconnect circuit comprises at least two conductive layers and at least one inner insulator, which extends between these conductive layers in some circuit portions and allows for conductive layers to directly interface in other circuit portions (e.g., busbar portions). In other words, when high current-carrying capabilities are needed, multiple conductive layers (e.g., all conductive layers) are in that portion of the circuit. It should be noted that stacking multiple conductive layers increases the flexibility of this stack in comparison to a monolithic component with the same thickness (and the same current-carrying capability). Alternatively, when only low current-carrying capabilities are needed (e.g., for voltage sensing), fewer than all conductive layers (e.g., only one conductive layer) can be used in this circuit portion. Since all components of the same conductive layer are formed from the same initial metal sheet, these components may be monolithically integrated (and do not require any later connections). Furthermore, components of different conductive layers may directly interface with each other (e.g., through an opening within an inner insulator layer) and even welded to each other (e.g., through an opening within an outer insulator layer). In some examples, the components of different conductive layers may be welded to each other while welding these to various external components (e.g., battery terminals). It should be noted that one or more inner insulators allow stacking multiple conductive layers while forming electrical connections between these layers, e.g., having multiple voltage traces crossing over.

FIGS. 1A-1E: Examples of Multilayered Flexible Interconnect Circuit Assemblies

The functional and structural aspects of multilayered flexible interconnect circuits will now be described in the context of FIGS. 1A-1E. Specifically, FIG. 1A is a top view of prismatic battery cells 190 forming a set, in accordance with some examples. In the illustrated example, the set includes 32 battery cells arranged into a 4-by-8 grid. However, any other number and/or arrangements of battery cells are within the scope. Each battery cell 190 comprises cell terminals 192, such as a positive cell tab and a negative cell tab. In the illustrated example, both cell terminals 192 are positioned on the same side of battery cell 190. However, other examples (e.g., with cell terminals being positioned on opposite sides of battery cells 190) are also within the scope. In these examples, multiple multilayered flexible interconnect circuits may be used to interconnect the same set of battery cells 190. The cell terminals 192 are used for interconnecting the battery cells 190, e.g., with all cells being interconnected in series as further shown with the design of the multilayered flexible interconnect circuit 100 presented in FIGS. 1B and 1C. However, other connection schemes (e.g., parallel and various combinations of parallel and in-series connections) are also within the scope. Furthermore, FIG. 1A illustrates that each of the battery cells 190 comprises a vent plug 194 that allows for gases and other materials to escape from one or more battery cells 190 experiencing internal overpressurization (e.g., due to a thermal runaway). As further described below, a multilayered flexible interconnect circuit may be used to form vent channels above these vent plugs 194.

Figure 1B:
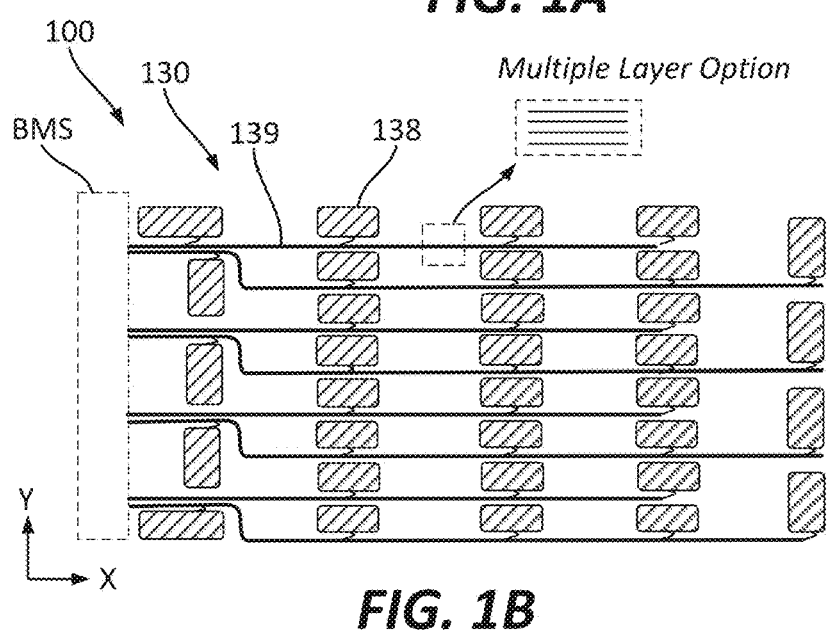
FIG. 1B is a top view of various conductive components of a multilayered flexible interconnect circuit used for interconnecting the prismatic battery cells of FIG. 1A as well as provide voltage sense functions, in accordance with some examples.

FIG. 1B is a top view of conductive components 130 of a multilayered flexible interconnect circuit 100 used for interconnecting the cell terminals 192 of the prismatic battery cells 190 in FIG. 1A, in accordance with some examples. Insulator layers are not shown in this view to better illustrate the footprint of these conductive components 130. Each conductive component is formed by one or more conductive layers. The number of the conductive layers forming each component depends on the current carrying requirement of these specific components.

Specifically, these conductive components 130 may include busbars 138 and voltage traces 139. Busbars 138 are examples of high-current-carrying conductive components, each formed using multiple conductive layers of the multilayered flexible interconnect circuit 100. Busbars 138 are connected (e.g., welded) to the cell terminals 192 during the fabrication of a battery assembly 180 (e.g., a battery pack). It should be noted that during this fabrication operation, all busbars 138 are integrated and supported within the multilayered flexible interconnect circuit 100 thereby eliminating the need to handle and align each busbar (in comparison to conventional methods).

Voltage traces 139 are examples of low-current carrying conductive components, each formed using fewer than all conductive layers of the multilayered flexible interconnect circuit 100 (e.g., only one conductive layer for each voltage trace). However, having multiple conductive layers allows routing/stacking multiple voltage traces 139 in the same portion of the multilayered flexible interconnect circuit 100. Furthermore, precise patterning of each conductive layer allows the positioning of multiple voltage traces 139 side-by-side. Voltage traces 139 can be connected to each of the busbars 138 and some form of controller (e.g., a battery management system). More specifically, a voltage trace 139 can be monolithic with one or more busbars 138 or, more specifically, with a portion of the conductive layer that both forms this voltage trace 139 and a portion of the busbar. In some examples, a battery management system is a part of a multilayered flexible interconnect circuit 100. Alternatively, the busbar portion 102 can be connected to the multilayered flexible interconnect circuit 100 or, more specifically, to the voltage traces 139 of the multilayered flexible interconnect circuit 100 during the fabrication of a battery assembly 180 (e.g., a battery pack).

Overall, a multilayered flexible interconnect circuit 100 comprises multiple conductive layers stacked along the Z-direction as further described below with reference to FIGS. 2A-2E. Some conductive components 130 (e.g., high-current carrying components such as busbars 138) may be formed using all or at least two or more conductive layers. Other conductive components 130 (e.g., low-current carrying components such as voltage traces 139) may be formed using a single conductive layer or at least fewer than all conductive layers.

Figure 1C:
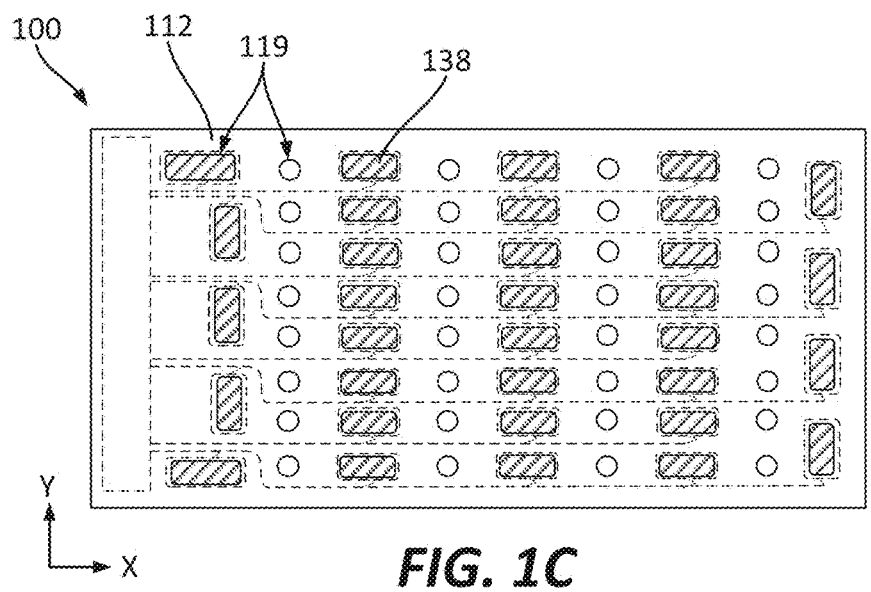
FIG. 1C is a top view of the entire multilayered flexible interconnect circuit comprising the conductive components of FIG. 1B and insulating layers (e.g., for supporting these conductive components) and used for interconnecting the prismatic battery cells of FIG. 1A, in accordance with some examples.

FIG. 1C is a top view of the flexible interconnect circuit 100 comprising the conductive components 130 of FIG. 1B and a second outer insulator layer 112 (which is a top insulator in this view), in accordance with some examples. Insulators (outer and inner insulator layers) are used to support the conductive components 130 within the multilayered flexible interconnect circuit 100. The support is particularly important with multiple conductive layers, disjoined components, extensions, and other features of conductive layers that may not be available in conventional circuits. As shown in FIG. 1C, the second outer insulator layer 112 comprises multiple openings 119, e.g., to expose at least portions of busbars 138 and, in some examples, vent plugs 194.

Figure 1D:
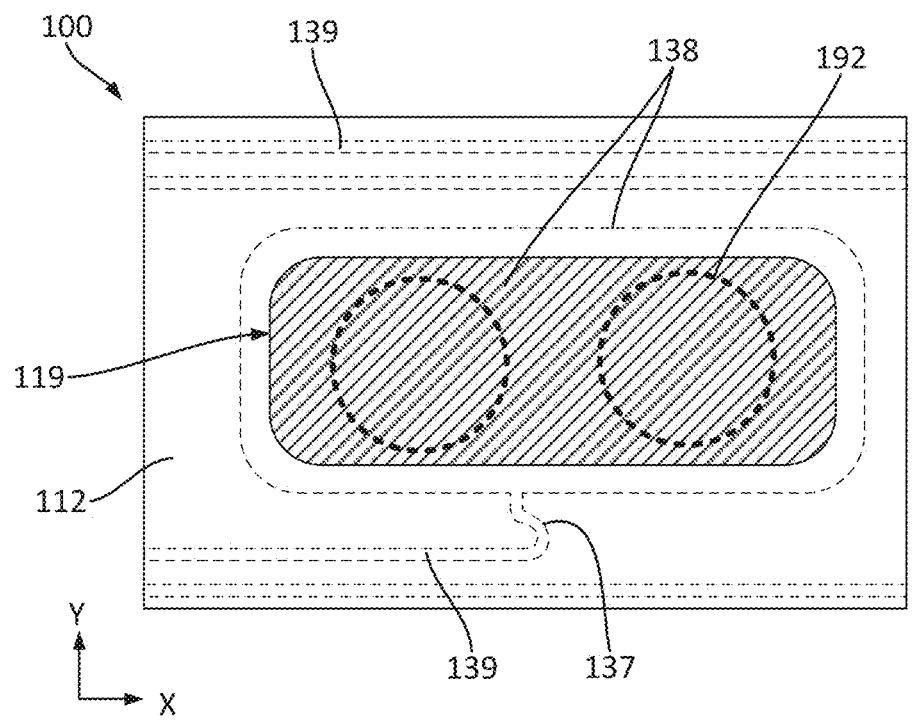
FIG. 1D is an expanded top view of a portion of the flexible interconnect circuit in FIG. 1C illustrates an opening in the top (second) outer insulator and various boundaries of the conductive components, in accordance with some examples.
Figure 1E:
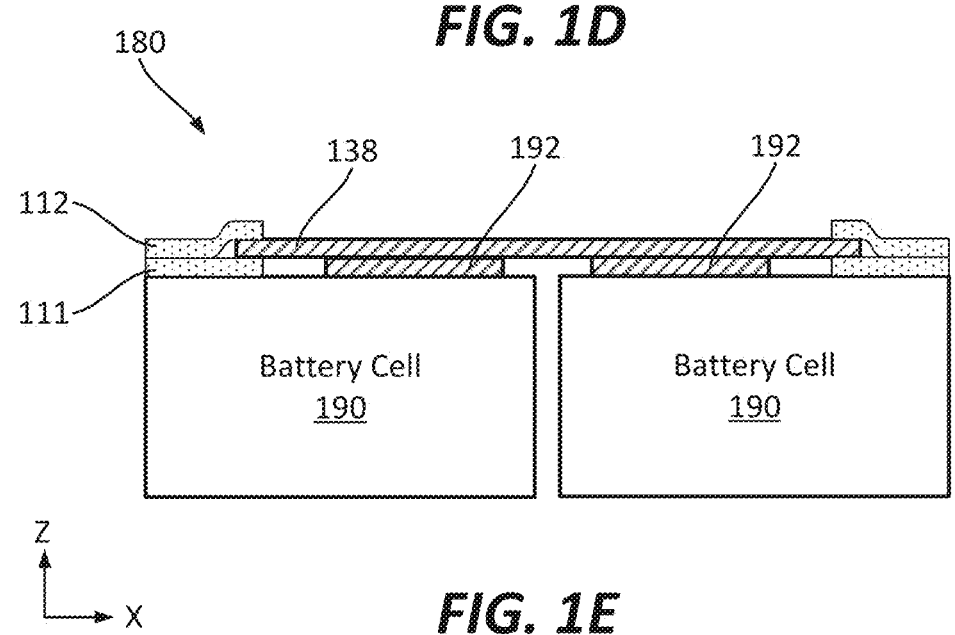
FIG. 1E is a schematic side view of two battery cells interconnected by the busbar of a multilayered flexible interconnect circuit, in accordance with some examples.

FIG. 1D is an expanded top view of a portion of the multilayered flexible interconnect circuit 100 in FIG. 1C illustrating openings 119 in the second outer insulator layer 112 and the boundaries of conductive components, in accordance with some examples. Specifically, a portion of the busbar 138 may overlap with the second outer insulator layer 112 (and, e.g., a first outer insulator layer 111 as shown in FIG. 1E) to support the busbar 138 within the multilayered flexible interconnect circuit 100. Furthermore, FIG. 1D illustrates a voltage trace 139 extending to the busbar 138 (and being monolithic with one of the conductive layers forming the busbar 138). A portion of the voltage trace 139 can be specifically shaped and referred to as a voltage trace connection portion 137. The voltage trace connection portion 137 may interconnect a linear portion of the voltage trace 139 and busbar 138 and allow for the out-plane movement of the busbar 138 relative to the linear portion of the voltage trace 139 while preserving this monolithic connection. FIG. 1D also illustrates additional voltage trace 139 extending next to each other (e.g., to other busbars). As noted above, additional voltage traces can be offset along the Z-axis.

Figure 2A:
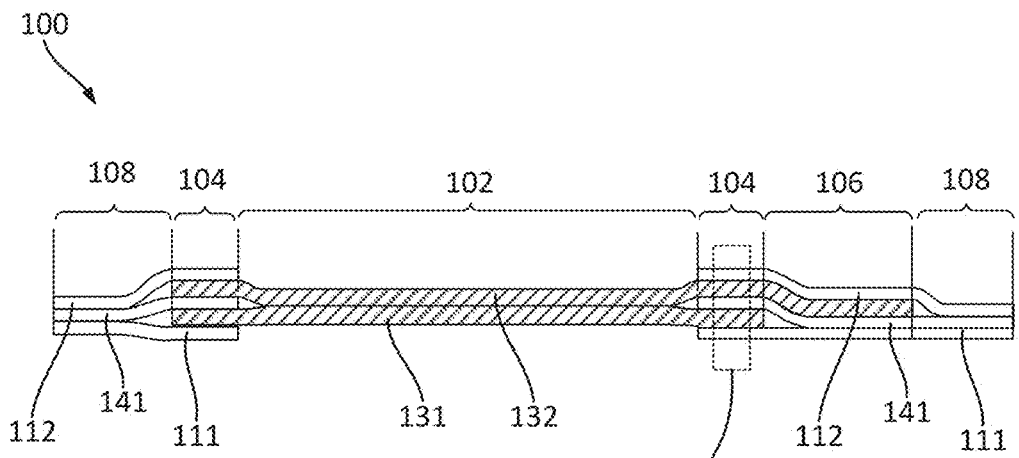
FIG. 2A is a cross-sectional side view of a multilayered flexible interconnect circuit identifying various components and portions of the circuit, in accordance with some examples.

FIGS. 2A-2H: Examples of Different Portions of Multilayered Flexible Interconnect Circuits FIG. 2A is a cross-sectional side view of multilayered flexible interconnect circuit 100, in accordance with some examples. The multilayered flexible interconnect circuit 100 illustrated in FIG. 2A comprises a first outer insulator layer 111, a second outer insulator layer 112, an inner insulator layer 141, a first conductive layer 131, and a second conductive layer 132. The first outer insulator layer 111, second outer insulator layer 112, inner insulator layer 141, first conductive layer 131, and second conductive layer 132 collectively define a busbar portion 102, a busbar support portion 104, and a metal-free portion 108 of the flexible interconnect circuit 100. In some examples, these components also define an insulated conductor portion 106 of the flexible interconnect circuit 100. The structure and function of each of these portions will now be described in more detail. These portions may have different combinations of the first outer insulator layer 111, second outer insulator layer 112, inner insulator layer 141, first conductive layer 131, and second conductive layer 132 thereby forming different components of the multilayered flexible interconnect circuit 100. For example, a combination of the busbar portion 102 and busbar support portion 104 forms a busbar 138. More specifically, the busbar portion 102 represents the exposed portion of the busbar 138 allowing various connections to the busbar. The busbar support portion 104 provides the mechanical support to the busbar portion 102.

Referring to FIG. 2A, in the busbar portion 102, the first conductive layer 131 and the second conductive layer 132 directly interface with each other. In other words, the inner insulator layer 141 is not a part of the busbar portion 102 or, more specifically, the inner insulator layer 141 has an opening that coincides with the busbar portion 102. The interfacing allows to directly interconnect the first conductive layer 131 and the second conductive layer 132 (e.g., by welding).

Furthermore, the surface of the first conductive layer 131 facing away from the second conductive layer 132 is exposed, e.g., to form a direct connection to cell terminals 192. This exposure is provided by an opening in the first outer insulator layer 111. Similarly, the surface of the second conductive layer 132 facing away from the first conductive layer 131 is exposed, e.g., to allow for welding or other tools to reach the second conductive layer 132 such as while forming a connection to cell terminals 192. This exposure is provided by an opening in the second outer insulator layer 112. For example, in a battery assembly, the first conductive layer 131 may be positioned between the second conductive layer 132 and cell terminals 192. The welding of the first conductive layer 131 to the cell terminals 192 may be performed through the second conductive layer 132 such that this welding also interconnects the first conductive layer 131 and second conductive layer 132. Stacking and interconnecting the first conductive layer 131 and second conductive layer 132 allows a higher current between the cell terminals 192 connected to these conductive layers. In some examples, the busbar portion 102 provides a current rating of at least 50 Amperes, at least 100 Amperes, or even at least 200 Amperes. In the same or other examples, the collective thickness of all conductive layers forming the busbar portion 102 is at least 200 micrometers, at least 500 micrometers, at least 1 millimeter, or even at least 3 millimeters. This combined thickness depends on the (1) required current ratings, (2) one or more materials of the conductive layers, (3) the thickness of each layer, and (4) the number of layers. It should be noted that separating this thickness into multiple layers allows to provide flexibility in the busbar portion 102 as further described with reference to FIGS. 4A-4B. Furthermore, the multilayered design allows to use of different footprints/patterns for each conductive layer thereby monolithically integrating different features into one or more conductive layers.

To form a busbar portion 102, an opening is formed in each of the first outer insulator layer 111, second outer insulator layer 112, and inner insulator layer 141. In other words, each of the first outer insulator layer 111, second outer insulator layer 112, and inner insulator layer 141 has an opening in the busbar portion 102. The opening in the inner insulator layer 141 allows the first conductive layer 131 and the second conductive layer 132 to directly interface with each other. The opening in the first outer insulator layer 111 provides access and exposes a portion of the first conductive layer 131, e.g., to form connections to cell terminals 192. The opening in the second outer insulator layer 112 provides access and exposes a portion of the second conductive layer 132, e.g., during welding of the second conductive layer 132 to the first conductive layer 131 and to the cell terminals 192.

Figure 2B:
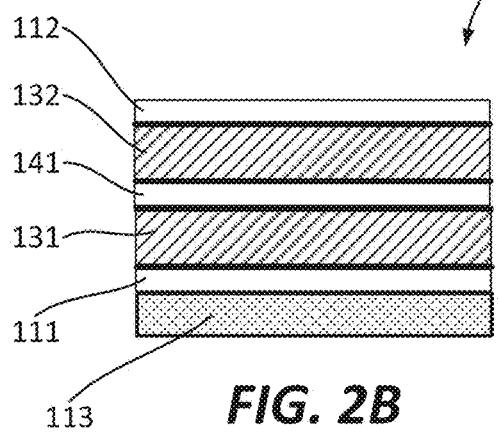
FIG. 2B is an expanded cross-sectional side view of the busbar support portion of the flexible interconnect circuit in FIG. 2A, in accordance with some examples.

Referring to FIG. 2A, in some examples, the busbar support portion 104 can partially surround and support the busbar portion 102. FIG. 2A is a schematic cross-sectional side view of a busbar support portion 104 of the multilayered flexible interconnect circuit 100, in accordance with some examples. Specifically, before being connected to cell terminal 192, different conductive layers are not interconnected or otherwise attached in the busbar portion 102. In other words, before being connected to cell terminals 192, the busbar portion 102 is a stack of multiple conductive layers that directly interface with each other but are not connected in the busbar portion 102. This connection is provided by the insulator layers in the busbar portion 102. Specifically, in the busbar support portion 104, the inner insulator layer 141 is stacked between and directly interfaces the first conductive layer 131 and the second conductive layer 132, e.g., as shown in FIGS. 2A and 2B. More specifically, the inner insulator layer 141 is bonded to and supports both the first conductive layer 131 and the second conductive layer 132. Furthermore, in the busbar support portion 104, the first conductive layer 131 is stacked between and directly interfaces the first outer insulator layer 111 and the inner insulator layer 141. The first conductive layer 131 can be bonded to and supported by both the first outer insulator layer 111 and the inner insulator layer 141. Finally, in the busbar support portion 104, the second conductive layer 132 is stacked between and directly interfaces the inner insulator layer 141 and the second outer insulator layer 112. Again, the second conductive layer 132 can be bonded and supported by both the inner insulator layer 141 and the second outer insulator layer 112. Overall, all three of the inner insulator layer 141, the first outer insulator layer 111, and the second outer insulator layer 112 can be used to support the first conductive layer 131 and second conductive layer 132 relative to each other and other components in the multilayered flexible interconnect circuit 100, at least in the busbar support portion 104.

In some examples, at least one of the first outer insulator layer 111 or the second outer insulator layer 112 or even both the first outer insulator layer 111 and the second outer insulator layer 112 are not present in the busbar support portion 104 thereby exposing one or both of the first conductive layer 131 and second conductive layer 132. The support to the first conductive layer 131 and the second conductive layer 132 can be provided by at least the inner insulator layer 141.

Figure 2C:
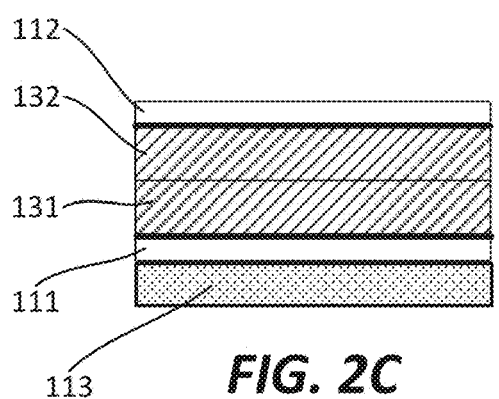
FIGS. 2C-2E are other examples of the busbar support portion of a flexible interconnect circuit, in accordance with some examples.

In other examples, the inner insulator layer 141 is not present in the busbar support portion 104. FIG. 2C is a schematic cross-sectional side view of a busbar support portion 104 of multilayered flexible interconnect circuit 100, in accordance with some examples. In these examples, first conductive layer 131 directly interfaces second conductive layer 132. First outer insulator layer 111 is bonded to and supports first conductive layer 131. Second outer insulator layer 112 is bonded to and supports second conductive layer 132. In these examples, first outer insulator layer 111 and second outer insulator layer 112 together provide necessary support to the conductive layers.

Figure 2D:
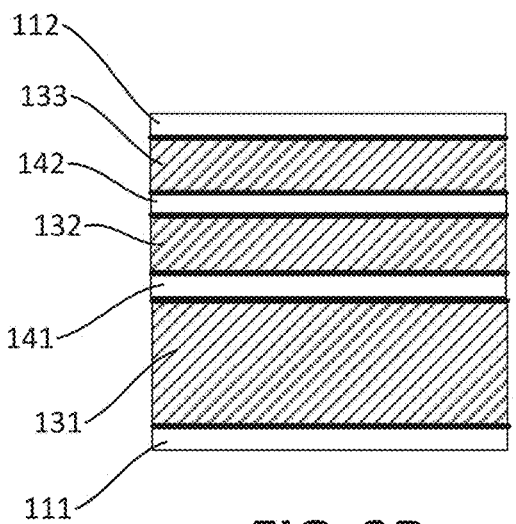
Figure 2E:
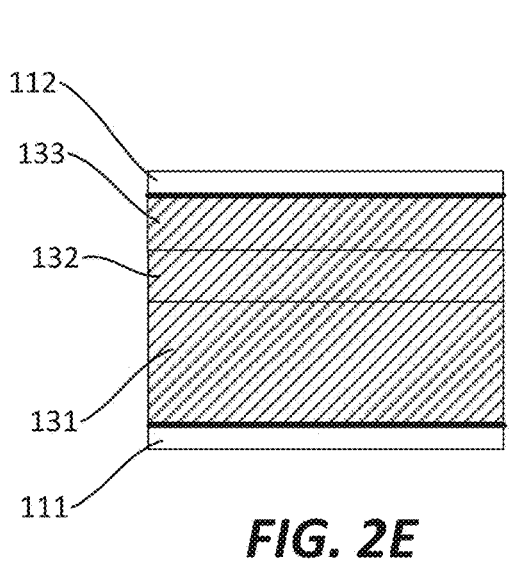

As noted above, the multilayered flexible interconnect circuit 100 illustrated in FIG. 2A comprises at least two conductive layers, e.g., a first conductive layer 131 and a second conductive layer 132. However, any number of conductive layers are within the scope. FIG. 2D is a schematic cross-sectional side view of the busbar support portion 104 of a multilayered flexible interconnect circuit 100, in accordance with some examples. In the example of FIG. 2D, the multilayered flexible interconnect circuit 100 comprises a third conductive layer 133. In this example, the multilayered flexible interconnect circuit 100 comprises two inner insulators. A second inner insulator 142 is positioned between the second conductive layer 132 and the third conductive layer 133. In some examples, a multilayered flexible interconnect circuit 100 comprises four, five, six, or even more conductive layers. In some other examples, one or more inner insulator layers is not present, and the entire support of the conductive layers is provided by first outer insulator layer 111 and second outer insulator layer 112. For example, FIG. 2E is a schematic cross-sectional side view of the busbar support portion 104 of a multilayered flexible interconnect circuit 100, in accordance with some examples. In the example illustrated in FIG. 2E, the multilayered flexible interconnect circuit 100 has in the busbar support portion 104 first conductive layer 131, second conductive layer 132, and third conductive layer 133. First outer insulator layer 111 directly interfaces first conductive layer 131 and second outer insulator layer 112 directly interfaces third conductive layer 133. First outer insulator layer 111 is bonded to and supports first conductive layer 131 and second outer insulator layer 112 is bonded to and supports third conductive layer 133. In this example, there are no inner insulator layers present in the busbar support portion 104.

Referring to FIG. 2A, in some examples, in the metal-free portion 108, the inner insulator layer 141 is stacked between and directly interfaces the first outer insulator layer 111 and the second outer insulator layer 112. The metal-free portion 108 may be used for supporting different insulators relative to each other in the multilayered flexible interconnect circuit 100. Alternatively, the metal-free portion 108 is formed by the first outer insulator layer 111 and the second outer insulator layer 112 but not by the inner insulator layer 141 (i.e., the inner insulator layer 141 may not extend through the metal-free portion 108). Furthermore, in some examples, the metal-free portion 108 may be formed by the inner insulator layer 141 and only one or the first outer insulator layer 111 and the second outer insulator layer 112. The metal-free portion 108 can form at least some of the outside edges of the multilayered flexible interconnect circuit 100 (e.g., to position and seal the first conductive layer 131 and second conductive layer 132 away from these edges). In some examples, all conductive layers of the multilayered flexible interconnect circuit 100 are positioned away from the edges of the multilayered flexible interconnect circuit 100. In this example, the connections to the conductive layers may be formed through various openings in the insulators. Alternatively, at least a portion of the first conductive layer 131 and/or second conductive layer 132 may extend through one or more edges of the multilayered flexible interconnect circuit 100.

Referring to FIG. 2A, in some examples, the multilayered flexible interconnect circuit 100 comprises an insulated conductor portion 106. Unlike the busbar support portion 104, which comprises multiple conductive layers (e.g., all conductive layers forming the adjacent the busbar portion 102), an insulated conductor portion 106 can include fewer than all conductive layers, such as only one conductive layer, e.g., a second conductive layer 132 as shown in FIG. 1A. Specifically, in the insulated conductor portion 106, the second conductive layer 132 is stacked between and directly interfaces the inner insulator layer 141 and the second outer insulator layer 112. The inner insulator layer 141 is stacked between and directly interfaces the second conductive layer 132 and the first outer insulator layer 111. Referring to FIG. 2A, in some examples, the insulated conductor portion 106 is positioned between the busbar support portion 104 and metal-free portion 108. In the same or other examples, the busbar support portion 104 is positioned between the busbar portion 102 and the metal-free portion 108.

In some examples, each of the first outer insulator layer 111, the second outer insulator layer 112, the inner insulator layer 141, the first conductive layer 131, and the second conductive layer 132 is formed from the same starting sheet. As such, each of the first outer insulator layer 111, the second outer insulator layer 112, the inner insulator layer 141, the first conductive layer 131, and the second conductive layer 132 may have the same thickness and composition throughout the entire footprint of the flexible interconnect circuit 100. In fact, some layers (e.g., the first outer insulator layer 111 and/or the second outer insulator layer 112) may be monolithic throughout the entire footprint of the flexible interconnect circuit 100. Other layers may be cut into disjoined components, e.g., busbars, insulating patches, etc.

It should be noted that each layer is individually patterned to form different portions/components of the multilayered flexible interconnect circuit 100.

Referring to FIG. 2B, in some examples, each of the first outer insulator layer 111 and the second outer insulator layer 112 comprises a polymer base and an adhesive layer covering a surface of and supported by the polymer base. The polymer base comprises one or more polymer selected from the group consisting of polyimide (PI), polyethylene naphthalate (PEN), polyethylene terephthalate (PET), polymethyl methacrylate (PMMA), ethyl vinyl acetate (EVA), polyethylene (PE), polyvinyl fluoride (PVF), polyamide (PA), and/or polyvinyl butyral (PVB). The adhesive layer comprises one or more of epoxy and polyurethane. In more specific examples, in the busbar support portion 104, the adhesive layer of the first outer insulator layer 111 directly interfaces and is adhered to the first conductive layer 131. The adhesive layer of the second outer insulator layer 112 directly interfaces and is adhered to the second conductive layer 132.

Referring to FIG. 2B, in some examples, the inner insulator layer 141 comprises an inner polymer base, a first inner adhesive layer, and a second inner adhesive layer. The inner polymer base is positioned between and supports each of the first inner adhesive layer and the second inner adhesive layer. The inner polymer base comprises one or more polymer selected from the group consisting of polyimide (PI), polyethylene naphthalate (PEN), polyethylene terephthalate (PET), polymethyl methacrylate (PMMA), ethyl vinyl acetate (EVA), polyethylene (PE), polyvinyl fluoride (PVF), polyamide (PA), and/or polyvinyl butyral (PVB). Each of the first inner adhesive layer and the second inner adhesive layer comprises one or more of epoxy and polyurethane. In more specific examples, in the busbar support portion 104, the first inner adhesive layer of the inner insulator layer 141 directly interfaces and is adhered to the first conductive layer 131. Furthermore, the adhesive layer of the second outer insulator layer 112 directly interfaces and is adhered to the second conductive layer 132.

In some examples, first outer insulator layer 111, second outer insulator layer 112, and inner insulator layer 141 are thermoformable. Thermoformable insulating layers provide the benefit of high aspect ratio coverage of the conductive layers. In these examples, first outer insulator layer 111, Second outer insulator layer 112, and inner insulator layer 141 may include (or be formed from) polyimide (PI), polyethylene naphthalate (PEN), polyethylene terephthalate (PET), polymethyl methacrylate (PMMA), ethyl vinyl acetate (EVA), polyethylene (PE), polyvinyl fluoride (PVF), polyamide (PA), and/or polyvinyl butyral (PVB).

In some examples, each of the first outer insulator layer 111 and second outer insulator layer 112 comprises polypropylene (PP). Polypropylene (PP) is relatively inexpensive compared to some other materials that may be used for insulating layers. This can lower the overall cost of materials to manufacture multilayered flexible interconnect circuit 100. However, polypropylene (PP) also has a relatively low surface energy compared with other materials. This low surface energy can make attaching other layers of the multilayered flexible interconnect circuit 100 to the first outer insulator layer 111 and/or the second outer insulator layer 112 challenging. In some examples, each of the first outer insulator layer 111 and the second outer insulator layer 112 further comprises a different polymer material having a higher surface energy, forming one or more outer sublayers directly interfacing the polypropylene (PP). For example, the one or more outer sublayers may comprise a polyurethane (PU), a polyamide (PA), polyethylene (PE), or polyethylene terephthalate (PET). In some examples, the one or more outer sublayers may comprise a non-conductive adhesive selected from the list comprising an epoxy, an acrylate, and a polyester.

In some examples, each of the first conductive layer 131 and the second conductive layer 132 comprises aluminum. However, other metals (e.g., copper) are also within the scope. In some examples, all conductive layers (e.g., both the first conductive layer 131 and the second conductive layer 132) are formed from the same material, e.g., aluminum, copper, or the like. Alternatively, different metals may be used for the first conductive layer 131 and the second conductive layer 132. The use of aluminum (instead of copper) may help with lowering the overall circuit weight and also with lowering the minimum achievable fuse current rating. Specifically, aluminum has a higher resistivity and lower melting temperature than copper. As such, forming fusible links in an aluminum conductive layer may allow for more precise control of the fusible parameters (for the same size tolerance). In general, the first conductive layer 131 and the second conductive layer 132 may be formed from any conductive material that is sufficiently conductive (e.g., a conductivity being greater than $10^6$ S/m or even greater than $10^7$ S/m to allow for current flow through the foil with low power loss.

In some examples, the first conductive layer 131 and the second conductive layer 132 may include a surface sublayer or coating for providing a low electrical contact resistance and/or improving corrosion resistance. The surface sublayer may assist with forming electrical interconnections using techniques/materials including, but not limited to, soldering, laser welding, resistance welding, ultrasonic welding, bonding with conductive adhesive, or mechanical pressure. Surface sublayers, which may provide a suitable surface for these connection methods include, but are not limited to, tin, lead, zinc, nickel, silver, palladium, platinum, gold, indium, tungsten, molybdenum, chrome, copper, alloys thereof, organic solderability preservative (OSP), or other electrically conductive materials. Furthermore, the surface sublayer may be sputtered, plated, cold-welded, or applied via other means. In some examples, the thickness of the surface sublayer may range from 0.05 micrometers to 10 micrometers or, more specifically, from 0.1 micrometers to 2.5 micrometers. Furthermore, in some examples, the addition of a coating of the OSP on top of the surface sublayer may help prevent the surface sublayer itself from oxidizing over time. The surface sublayer may be used when a base sublayer of the first conductive layer 131 and the second conductive layer 132 includes aluminum or its alloys. Without protection, exposed surfaces of aluminum tend to form a native oxide, which is insulating. The oxide readily forms in the presence of oxygen or moisture. To provide a long-term stable surface in this case, the surface sublayer may be resistant to the in-diffusion of oxygen and/or moisture. For example, zinc, silver, tin, copper, nickel, chrome, or gold plating may be used as surface layers on an aluminum-containing base layer.

In some examples, each of the first conductive layer 131 and the second conductive layer 132 has a thickness of 100-400 micrometers or, more specifically, 200-300 micrometers. The total thickness of all conductive layers forming a busbar can be at least 400 micrometers, at least 600 micrometers, at least 800 micrometers, or even at least 1,000 micrometers such as 500-2,000 micrometers or, more specifically, 600-1,200 micrometers. This thickness depends on the current-carrying requirements from the busbar. In some examples, all conductive layers in a multilayered flexible interconnect circuit 100 have the same thickness, e.g., as shown in FIG. 2B. Alternatively, at least one conductive layer is thicker than another conductive layer in the multilayered flexible interconnect circuit 100, e.g., as shown in FIG. 2D (illustrating the first conductive layer 131 being thicker than the second conductive layer 132 and the third conductive layer 133).

Referring to FIG. 2B, in some examples, a multilayered flexible interconnect circuit 100 further comprises a circuit bonding layer 113, e.g., a double-sides pressure sensitive adhesive (PSA) layer.

Figure 2F:
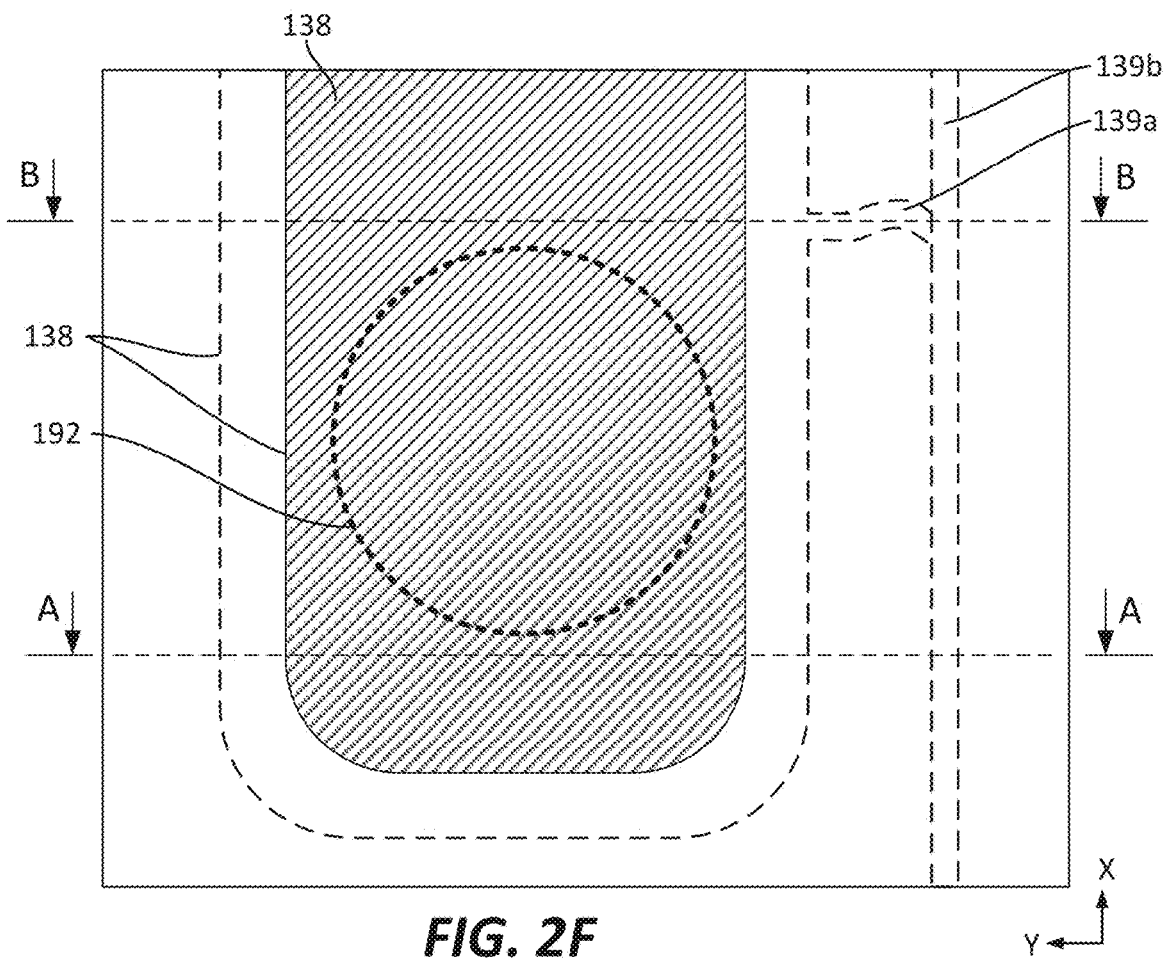
FIG. 2F is a top expanded view of a portion of the flexible interconnect circuit that illustrates an opening in the top (second) outer insulator and various boundaries of the conductive components, in accordance with some examples.
Figure 2G:
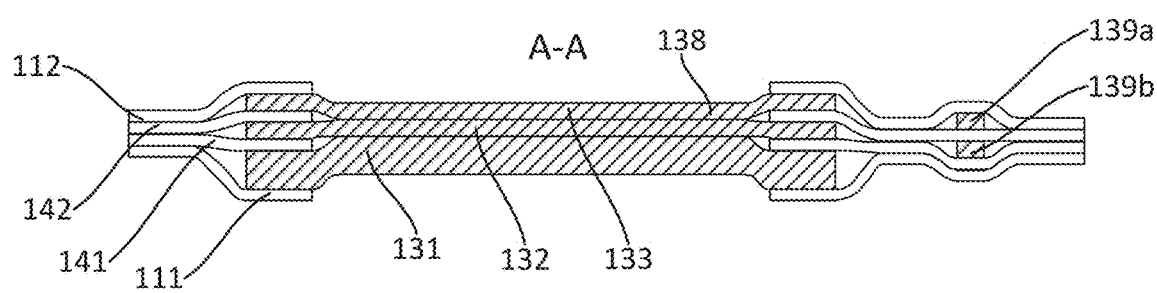
FIGS. 2G and 2H are two different cross-sections at different locations (along the X-axis) of the flexible interconnect circuit in FIG. 2F, in accordance with some examples.
Figure 2H:
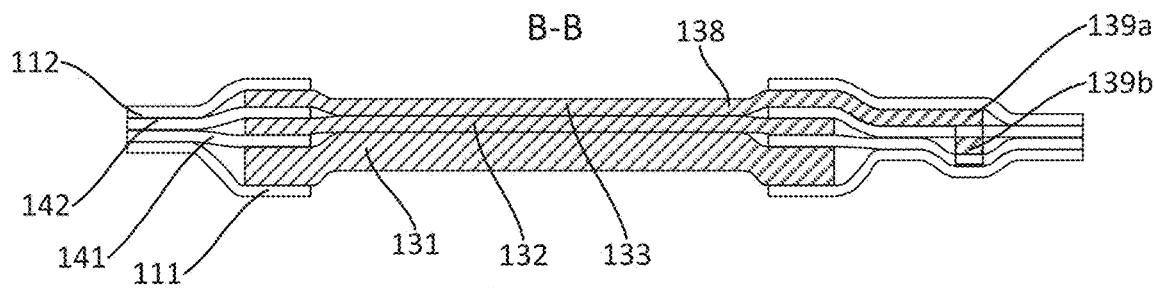

FIGS. 2F-2H provide additional illustrations of various components positioned in different portions of the multilayered flexible interconnect circuit 100, in accordance with some examples. Specifically, FIG. 2G illustrates two voltage traces 139 (i.e., first voltage trace 139a and second voltage trace 139b) extending adjacent to a busbar 138 and stacked along the Z-axis. These two voltage traces 139 are isolated from each other by a second inner insulator 142. First voltage trace 139a may be formed from the third conductive layer 133, while the second voltage trace 139b may be formed from the second conductive layer 132. In fact, FIG. 2H illustrates the first voltage trace 139a being monolithic with a portion of the busbar 138, i.e., may be formed from the third conductive layer 133 extending across multiple different components.

FIGS. 3A-3G: Examples of Support Units and Flexibility Slits

Depending on the size of battery assemblies, the size/footprint of a multilayered flexible interconnect circuit 100 can be rather substantial. Handling a large-size flexible circuit can be challenging, in particular during the installation and alignment of the circuit relative to battery cells 190. In some examples, the rigidity of the multilayered flexible interconnect circuit 100 can be increased by incorporating a support unit 150 to the circuit. Specifically, the support unit 150 can be operable as an exoskeleton and provided in selected parts of the multilayered flexible interconnect circuit 100 where some additional mechanical support is needed.

Figure 3A:
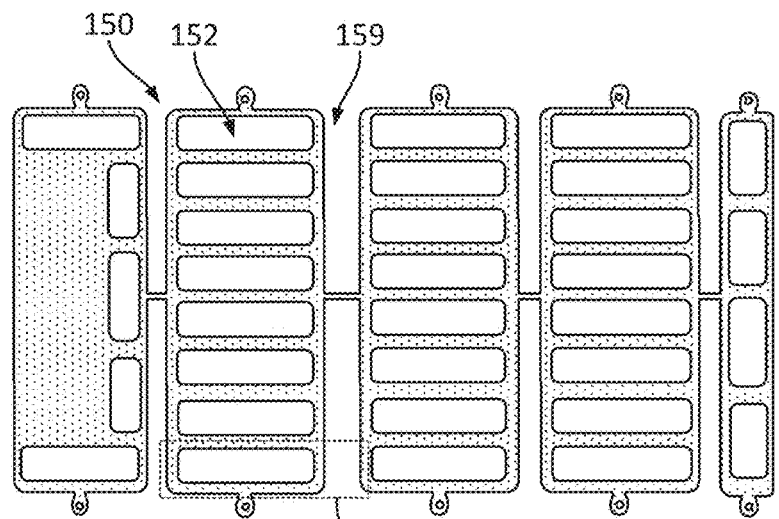
FIG. 3A is a top schematic view of a support unit of a flexible interconnect circuit, in accordance with some examples.

FIG. 3A is a top schematic view of a support unit 150 of a multilayered flexible interconnect circuit 100, in accordance with some examples. Other components of the multilayered flexible interconnect circuit 100 are not shown in this figure. The purpose of a support unit 150 is to provide in-plane rigidity to other circuit components, such as a stack of a first outer insulator layer 111, first conductive layer 131, inner insulator layer 141, second conductive layer 132, and second outer insulator layer 112. Most of these layers are flexible and may change shape during fabrication, handling, and installation of the multilayered flexible interconnect circuit 100, which can cause various difficulties. As noted above, the stack may not be sufficiently rigid (at least to maintain the in-plane shape). Furthermore, as described above, in some examples, not all layers are present in various portions of the multilayered flexible interconnect circuit 100.

Figure 3B:
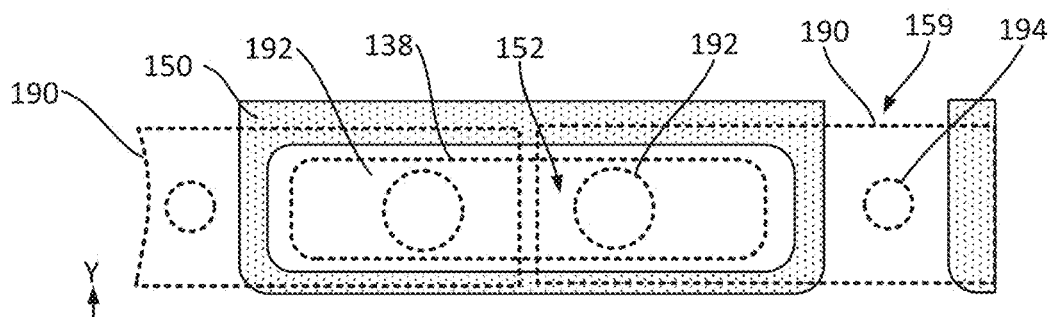
FIG. 3B is a top expanded view of a portion of the support unit in FIG. 3B with reference to various components of the battery cells, in accordance with some examples.

The support unit 150 may be formed from a rigid plastic material such as polypropylene, polystyrene, nylon, polycarbonate, and/or methacrylate. For example, a support unit 150 may be molded or 3-D printed. In some examples, support unit 150 may comprise various openings, such as busbar access openings 152 and vent channels 159. Referring to FIG. 3B, each busbar access opening 152 may be aligned with busbars 138 (and during the installation with cell terminals 192). These busbar access openings 152 may be similar to (e.g., overlap with) the openings in the first outer insulator layer 111, the inner insulator layer 141, and the second outer insulator layer 112. In some examples, the busbar access openings 152 fully overlap with the openings in the first outer insulator layer 111, the inner insulator layer 141, and the second outer insulator layer 112. During the installation of the multilayered flexible interconnect circuit 100, the vent channels 159 may overlap with vent plugs 194 such that any gases escaping through these vent plugs 194 can flow through the vent channels 159 to the edges of the battery assembly 180.

Figure 3C:
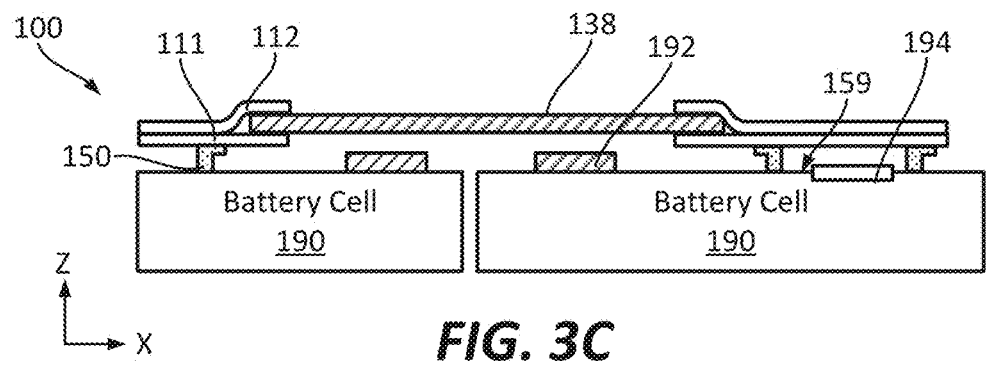
FIG. 3C is a side schematic view of a flexible interconnect circuit comprising a support unit prior to forming connections to battery cells, in accordance with some examples.
Figure 3D:
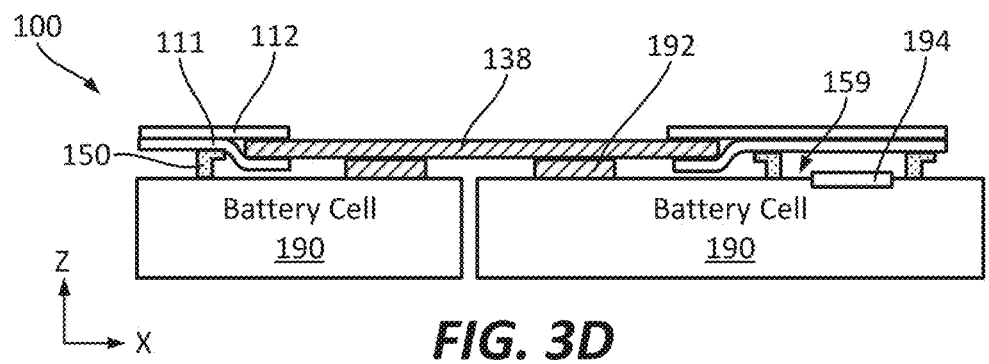
FIG. 3D is a side schematic view of the flexible interconnect circuit in FIG. 3E after forming the connections to the battery cells, in accordance with some examples.

Referring to FIGS. 3C and 3D, in some examples, the support unit 150 is positioned between the first outer insulator layer 111 and battery cells 190 during the installation of the multilayered flexible interconnect circuit 100. Prior to the installation, the support unit 150 may be bonded to the first outer insulator layer 111, e.g., using an adhesive. FIG. 3C is a side schematic view of the circuit comprising a support unit 150 prior to forming connections to battery cells 190, while FIG. 3D is a similar side schematic view of the same circuit after forming the connections to the battery cells 190. It should be noted that the busbar 138 is pushed out of the plane (along the Z-axis) while the remainder of the multilayered flexible interconnect circuit 100 is positioned at the same level.

Figure 3E:
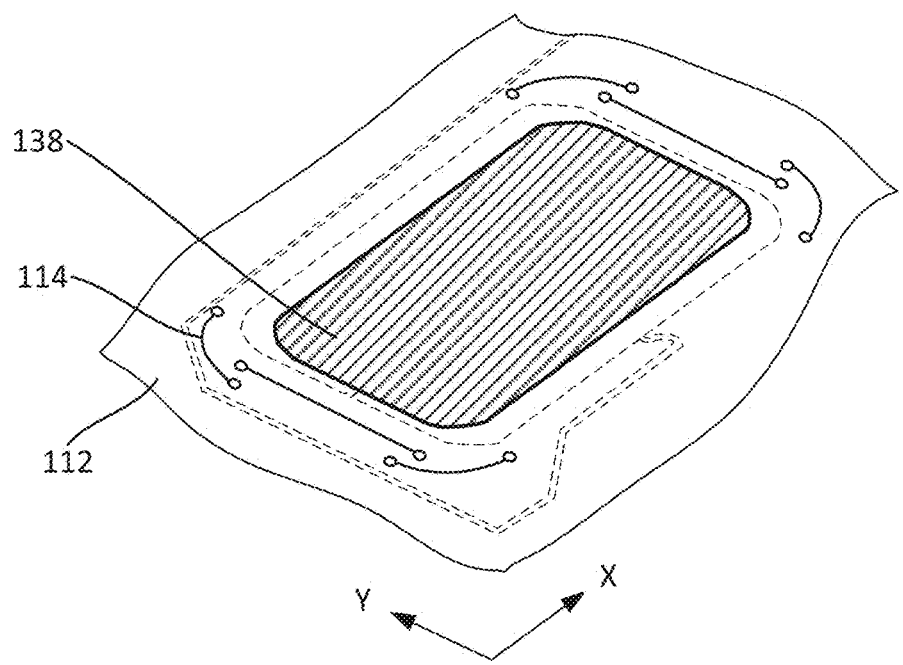
FIG. 3E is a schematic perspective view of the flexible interconnect circuit in FIG. 3E illustrates insulator flexibility slits for enabling out-plane flexibility of the busbar portion, in accordance with some examples.

FIG. 3E is a schematic perspective view of the flexible interconnect circuit in FIG. 3D illustrating insulator flexibility slits 114 for enabling out-plane flexibility of the busbar portion, in accordance with some examples. Specifically, the first outer insulator layer 111 and the second outer insulator layer 112 comprise a set of flexibility slits 114 in the metal-free portion 108 surrounding the busbar support portion 104 thereby providing out-of-plane flexibility of the busbar portion 102. These slits may be positioned around the corners of each busbar 138 and, in more specific examples, along the short edges of each busbar 138. Each slit may be disjoined from other slits to ensure that the first outer insulator layer 111 and the second outer insulator layer 112 can still provide support to other circuit components, e.g., the busbar.

Figure 3F:
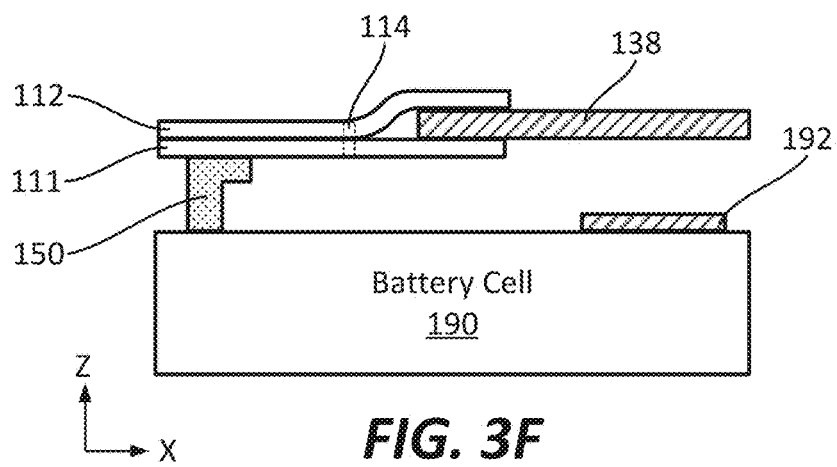
FIGS. 3F and 3G are two cross-sectional side views of the flexible interconnect circuit before and after forming the connection to a battery cell illustrating an out-of-plane flexibility provided by the flexibility slits in the outer insulators, in accordance with some examples.
Figure 3G:
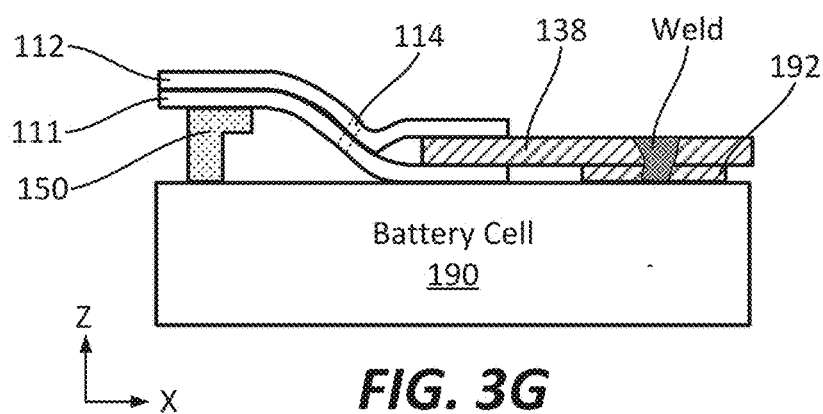

FIGS. 3F and 3G are two cross-sectional side views of a multilayered flexible interconnect circuit 100 before and after forming the connection to a battery cell 190 illustrating the out-of-plane flexibility provided by the flexibility slits 114 in the two outer insulators, in accordance with some examples. Furthermore, FIGS. 3E-3G illustrate the position of the flexibility slits 114 relative to the edge of the busbar 138 as well as relative to the support unit 150.

Figure 4A:
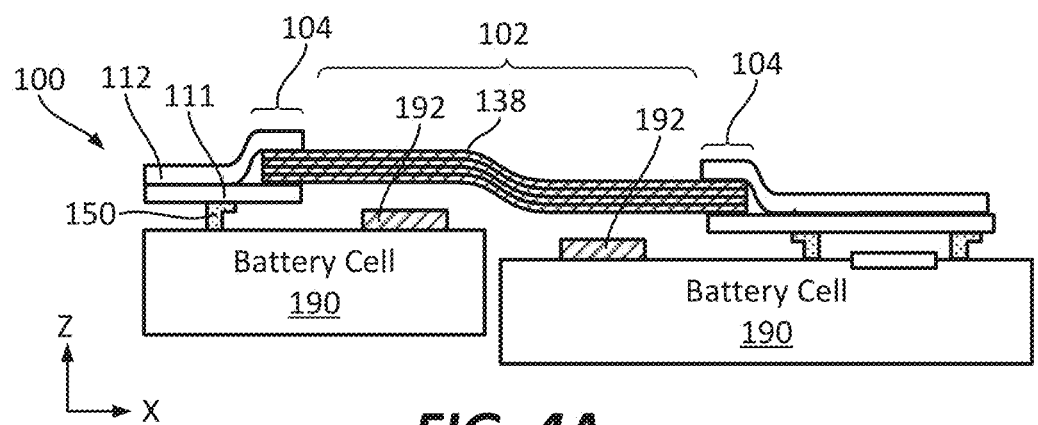
FIGS. 4A and 4B are side schematic views of a flexible interconnect circuit comprising multiple conductive layers forming a busbar portion before and after forming connections to battery cells, in accordance with some examples.
Figure 4B:
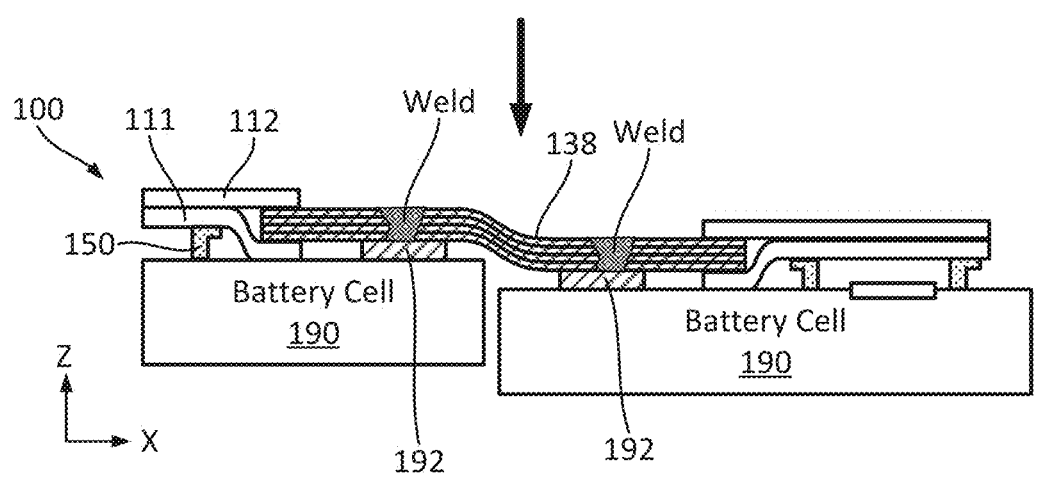

FIGS. 4A-4B: Out-of-plane Flexibility of Multiple Conductive Layers Forming Busbar Portions FIGS. 4A and 4B are side schematic views of a multilayered flexible interconnect circuit 100 comprising multiple conductive layers forming a busbar 138 before and after forming connections to battery cells 190, in accordance with some examples. Specifically, in these illustrations, the two battery cells 190 are shifted out-of-plane (along the Z-axis) relative to each other. The multilayered nature of the busbar 138 provides improved out-of-plane flexibility in comparison to a solid busbar that has the same thickness (without sacrificing the current-carrying capabilities). It should be noted that different conductive layers of the busbar 138 are not interconnected, at least within the busbar portion 102. This lack of connection improves the flexibility/conformality of the busbar 138 prior to welding.

Once the multilayered flexible interconnect circuit 100 is installed and the busbar 138 is welded to the cell terminals 192, the flexibility is reduced as the different conductive layers of the busbar 138 are now interconnected. At this point (after the installation and forming the connection), the busbar flexibility is not desirable to preserve the electrical connections between the busbar 138 and the cell terminals 192.

FIGS. 5A-5F: Examples of Utilizing Unconnected Conductive Layer Portion

When conductive layers of a multilayered flexible interconnect circuit 100 are patterned (e.g., starting with a continuous metal sheet), some portions of this metal sheet might not be needed to form various conductive components 130 such as busbars 138 and voltage traces 139. In some examples, the portions of the metal sheet that do not form any conductive components 130 can be removed (e.g., etched/cut/ablated away). This removal reduces the weight of the multilayered flexible interconnect circuit 100. Alternatively, some of these portions may be retained in a multilayered flexible interconnect circuit 100 to form other non-electrical components such as vent-channel forming metal portions 135.

Figure 5A:
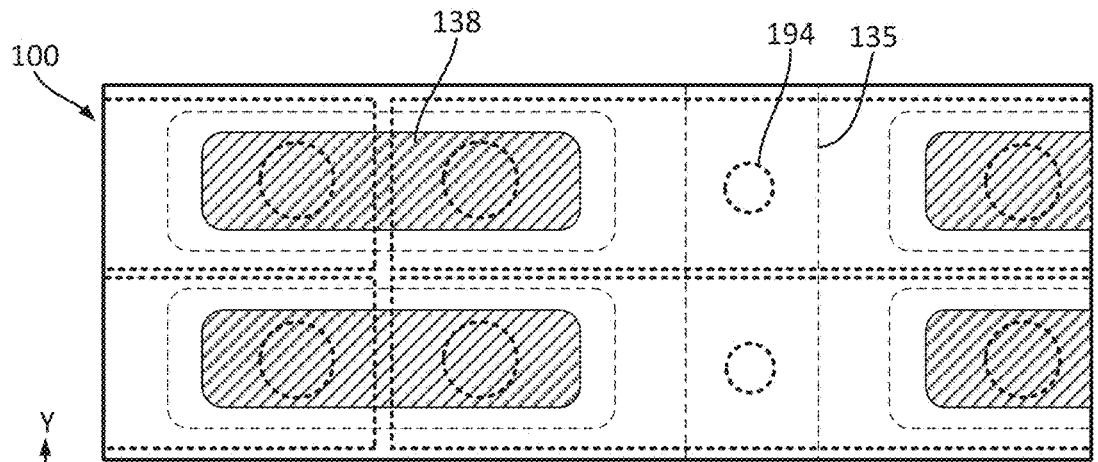
FIG. 5A is a top schematic view of a portion of a flexible interconnect circuit illustrating an unconnected conductive layer portion extending over pressure release valves in battery cells, in accordance with some examples.

FIG. 5A is a top schematic view of a portion of a multilayered flexible interconnect circuit 100 illustrating vent-channel forming metal portions 135 extending over the vent plug 194 in battery cells 190, in accordance with some examples. These vent-channel forming metal portions 135 can be electrically unconnected to other conductive components 130, e.g., busbars 138. This electrical isolation/separation allows putting these vent-channel forming metal portions 135 in contact with various components, such as the case of the battery cell 190 as further described below with reference to FIG. 5D.

Figure 5B:
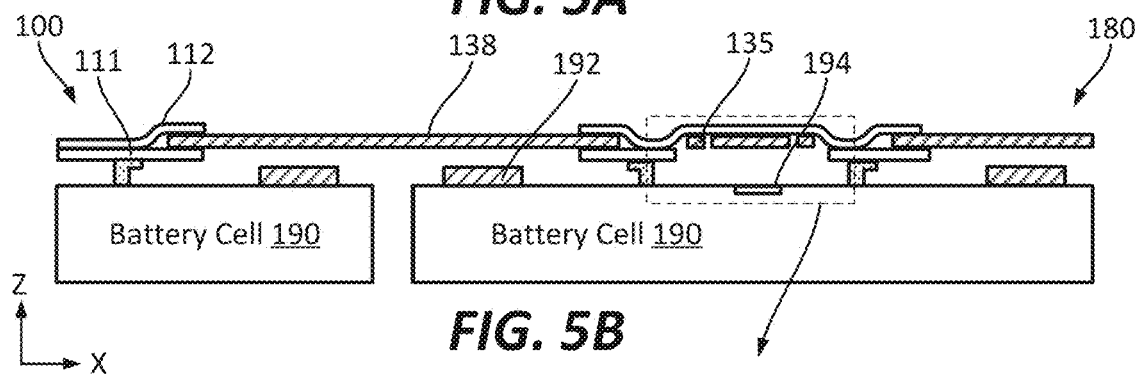
FIG. 5B is a side schematic view of the portion of the flexible interconnect circuit in FIG. 5A illustrates the unconnected conductive layer portion extending over the pressure release valves in the battery cells, in accordance with some examples.
Figure 5C:
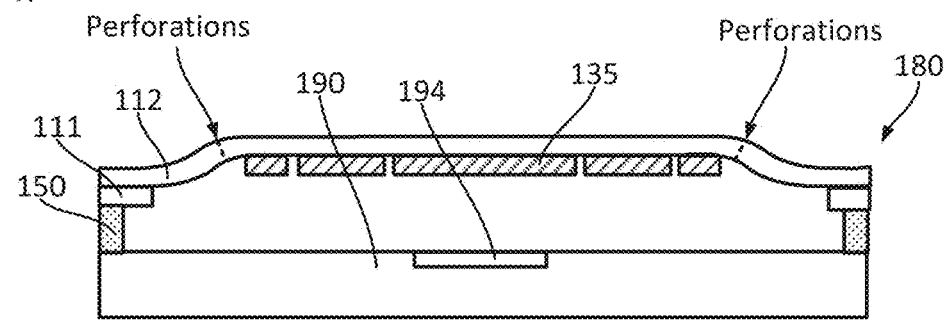
FIGS. 5C and 5D are side schematic views of a portion of the flexible interconnect circuit in FIG. 5B before and after shaping the unconnected conductive layer, in accordance with some examples.
Figure 5D:
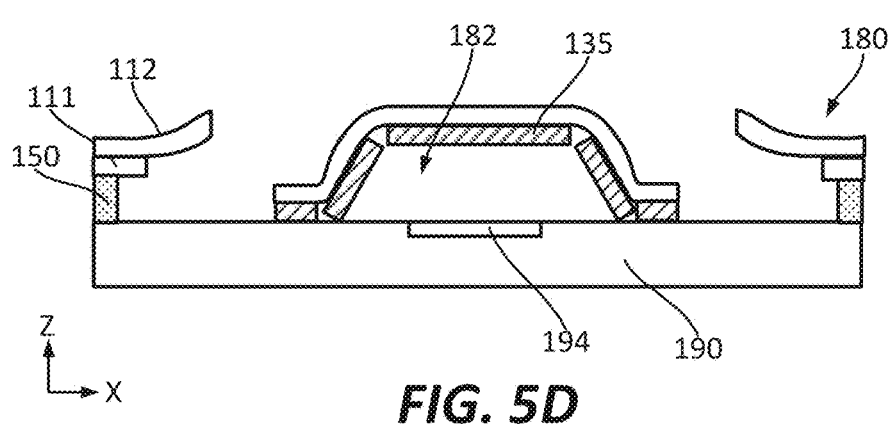

In some examples, vent-channel forming metal portion 135 can be a single monolithic strip. Alternatively, the vent-channel forming metal portion 135 can be patterned into multiple strips, e.g., to increase its out-plane flexibility/deformability as will now be described with reference to FIGS. 5B-5D. Specifically, FIG. 5B is a side schematic view of the portion of a multilayered flexible interconnect circuit 100 in FIG. 5A during the initial stages of the circuit installation over the battery cells 190. In this view, the busbar 138 is positioned over and aligned with the cell terminals 192, while the vent-channel forming metal portions 135 is positioned over and aligned with the vent plugs 194. FIG. 5C is a side schematic view of the portion of the multilayered flexible interconnect circuit 100 in FIG. 5B prior to shaping the vent-channel forming metal portion 135, in accordance with some examples. In this example, the vent-channel forming metal portion 135 is formed by multiple strips. Furthermore, one or both outer insulator layers (e.g., the second outer insulator layer 112) may have perforations to increase the out-of-plane flexibility. FIG. 5D is a side schematic view of the same vent-channel forming metal portion 135 as in FIG. 5C after shaping this vent-channel forming metal portion 135 to form a vent channel 182 over the vent plugs 194.

Figure 5E:
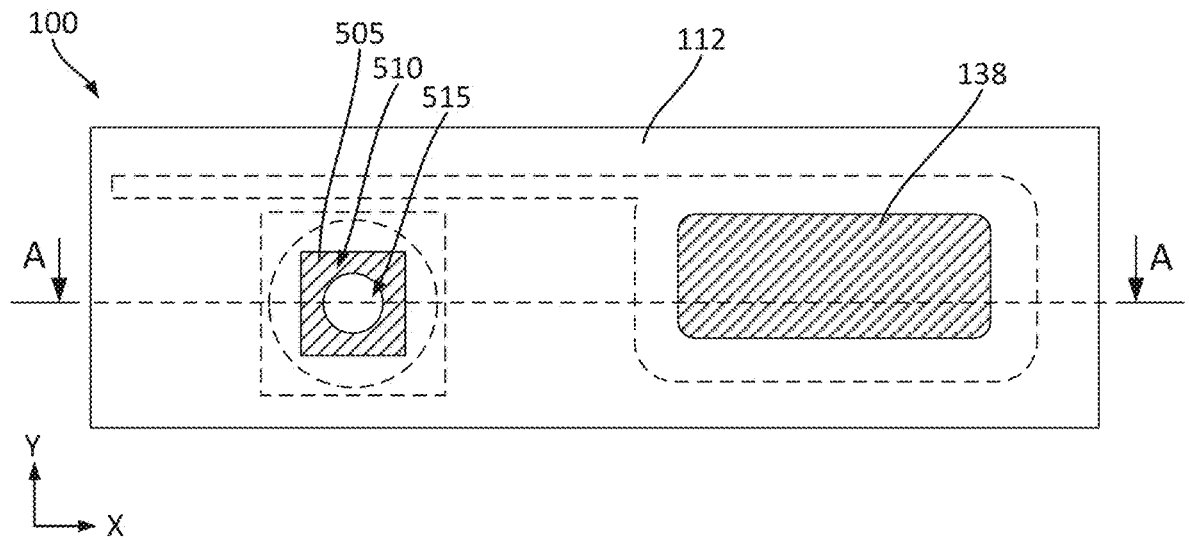
FIG. 5E is a top schematic view of a portion of a flexible interconnect circuit illustrating a registration portion, in accordance with some examples.
Figure 5F:
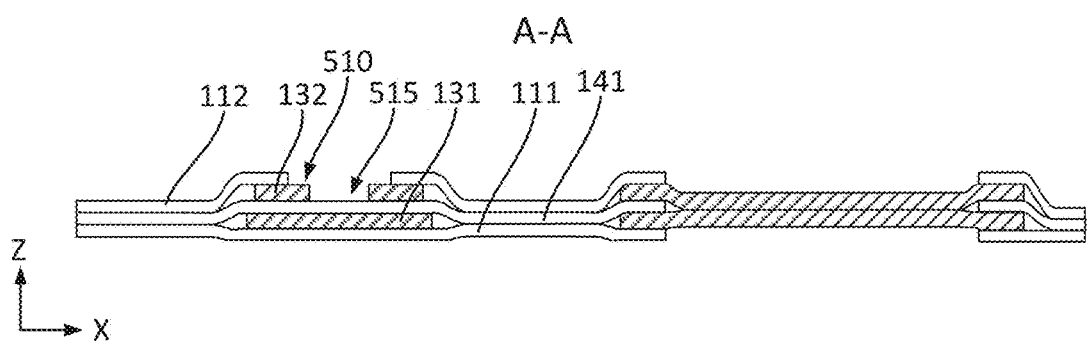
FIG. 5F is a schematic cross-sectional side view of the portion of a flexible interconnect circuit of FIG. 5E, in accordance with some examples.

Some portions of the metal sheet that do not form any conductive components 130 may be retained in a multilayered flexible interconnect circuit 100 to form registration portions 505. Such registration portions 505 may be beneficial as alignment features, for example, in aligning the multilayered flexible interconnect circuit 100 in the X-Y plane during manufacturing steps or installation. Such registration portions 505 may be formed, for example, during patterning of the insulating layers and conductive layers. In this way, forming registration portions 505 may provide a benefit in manufacturing time and cost as compared with, for example, creating registration marks by printing, painting, or etching marks or barcodes on an insulating layer outer surface in a separate manufacturing step. FIG. 5E is a top schematic view of a portion of a multilayered flexible interconnect circuit 100 illustrating a registration portion 505, in accordance with some examples. In some examples, registration portions 505 are formed from aligned openings in, for example, the second outer insulator layer 112 and the second conductive layer 132. In the example of FIG. 5E, first registration opening 510 is an opening, having a square shape, in second outer insulator layer 112. Aligned with first registration opening 510 is second registration opening 515. Second registration opening 515 is an opening, having a circle shape, in the second conductive layer 132. It should be noted that the length of the square shape of the first registration opening 510 along the line A-A is larger than the diameter of the circle shape of second registration opening 515 along the same line. In this way, the second registration opening 515 is visible through the first registration opening 510. FIG. 5F is a schematic cross-sectional side view of the multilayered flexible interconnect circuit 100 of FIG. 5E along line A-A, in accordance with some examples. As illustrated in FIG. 5F, a portion of inner insulator layer 141 is exposed through second registration opening 515 and first registration opening 510. In addition, a portion of second conductive layer 132 is exposed through the first registration opening 510. The appearance, when viewed as in the top view of FIG. 5E, of a portion of inner insulator layer 141 surrounded by a portion of second conductive layer 132, in turn surrounded by second outer insulator layer 112, forms a high-contrast image. Also illustrated in FIG. 5F is a retained portion of first conductive layer 131 and a first outer insulator layer 111 intact where it contacts the retained portion of first conductive layer 131. In this way, the registration portion 505 does not require a through-hole extending entirely through the thickness of the multilayered flexible interconnect circuit 100. Other shapes are within scope for both the first registration opening 510 and the second registration opening 515, including, but not limited to, triangles, rectangles, pentagons, hexagons, stars, lozenges, and trapezoids. In some examples, a registration portion 505 comprises additional registration openings, for example, in additional insulator layers and/or additional conductive layers. In some examples, a registration portion 505 comprises openings in at least the first outer insulator layer 111 and the first conductive layer 131 and the registration portion 505 is visible from a bottom view of the multilayered flexible interconnect circuit 100.

FIGS. 6A-6F: Examples of Integrated Return Busbars

Figure 6A:
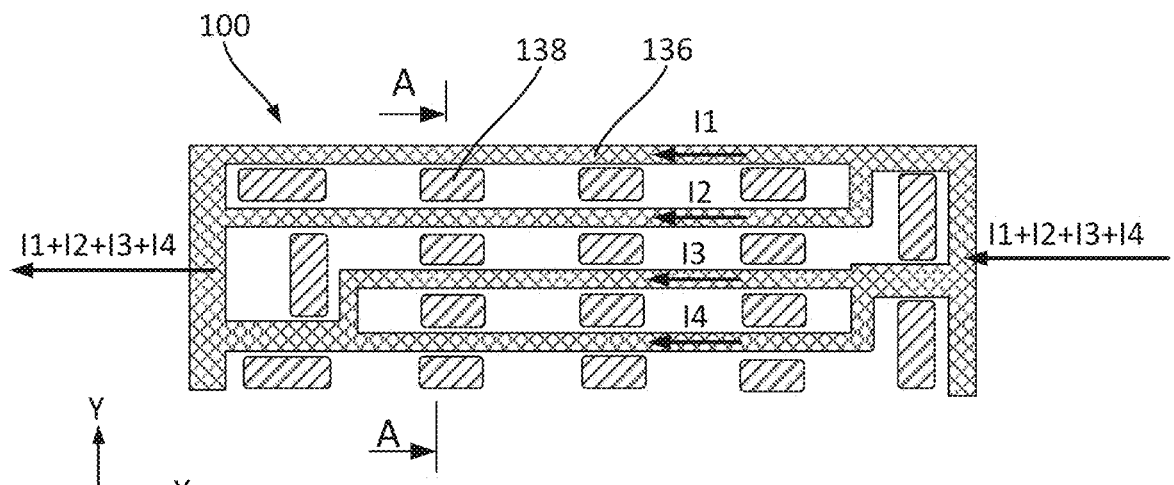
FIG. 6A is a top schematic view of conductive layers of a flexible interconnect circuit illustrating a high-current conductor (e.g., a return busbar) positioned among busbars, in accordance with some examples.
Figure 6B:
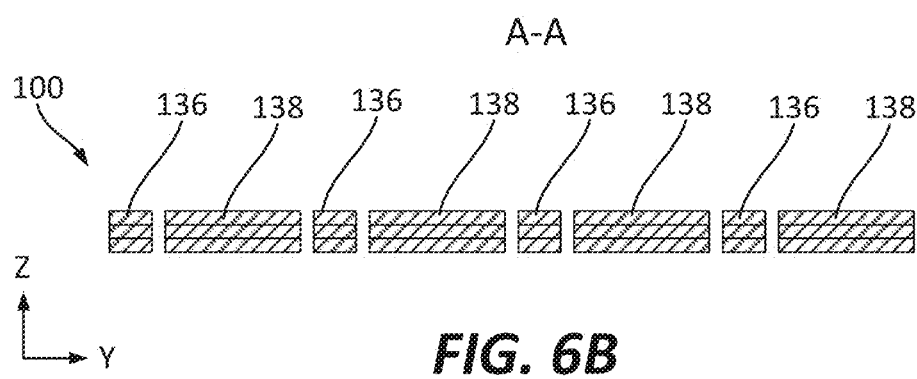
FIG. 6B is a side cross-sectional view of the conductive layers of the flexible interconnect circuit in FIG. 6A, in accordance with some examples.
Figure 6C:
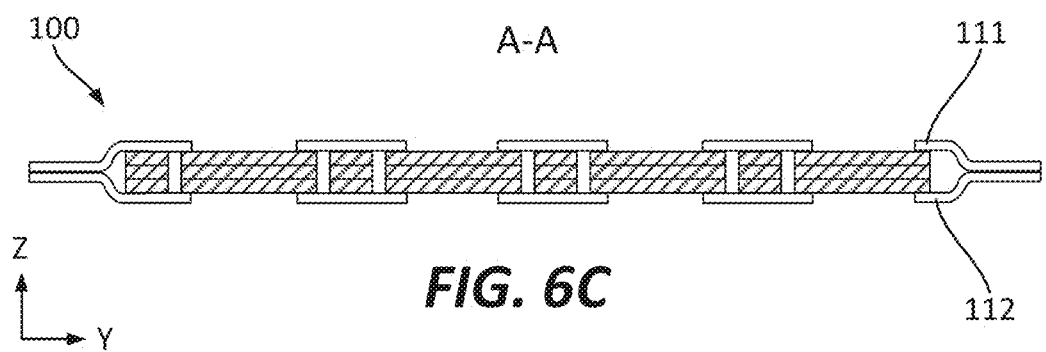
FIG. 6C is a side cross-sectional view of the conductive layers and corresponding insulating layers of the multilayered flexible interconnect circuit in FIGS. 6A and 6B, in accordance with some examples.

The patterning of continuous metal sheets allows forming of conductive components 130 that are positioned close to each other. Furthermore, with multiple conductive layers, different numbers of these layers may be used depending on the current-carrying requirements. These multilayered and patterning aspects allow the integrating of various features into a multilayered flexible interconnect circuit 100 such as voltage traces 139, described above. Furthermore, these aspects also allow integrating various high-current conductors 136, such as return busbars, as will now be described with reference to FIGS. 6A-6C. Specifically, FIG. 6A is a top schematic view of conductive layers of a flexible interconnect circuit illustrating a high-current conductor 136 (e.g., a return busbar) positioned among busbars 138, in accordance with some examples. The high-current conductor 136 is positioned proximate but unconnected to the busbars 138. To increase the current-carrying capabilities of the high-current conductor 136, the high-current conductor 136 can be branched out into multiple lines (e.g., based on the spacing available between the busbar 138). It should be noted that despite all these branching, various parts of the high-current conductor 136 remain monolithically integrated. FIG. 6B is a side cross-sectional view of the conductive layers of the flexible interconnect circuit in FIG. 6A, in accordance with some examples. FIG. 6C is a side cross-sectional view of the conductive layers and corresponding insulating layers of the multilayered flexible interconnect circuit in FIGS. 6A and 6B, in accordance with some examples.

Figure 6D:
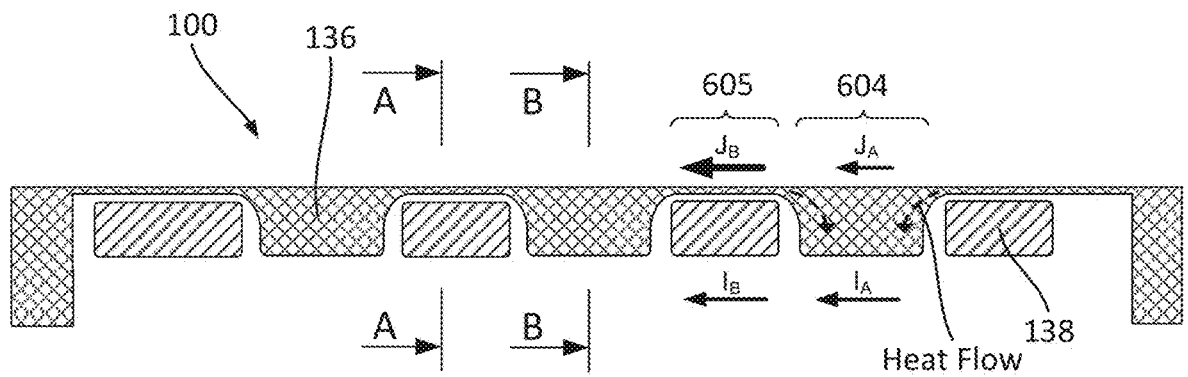
FIG. 6D is a top schematic view of conductive layers of a flexible interconnect circuit illustrating a high-current conductor (e.g., a return busbar) with integrated heatsink portions, in accordance with some examples.

In some examples, the multilayered and patterning aspects allow the integration of heat sinking features into the high-current conductor 136. FIG. 6D is a top schematic view of conductive layers of a portion of a multilayered flexible interconnect circuit 100, in accordance with some examples. As illustrated in FIG. 6D, high-current conductor 136 heatsink portions 604 and intersink portions 605 are proximate but unconnected to the busbars 138. The heatsink portions 604 and and intersink portions 605 are monolithic. The heatsink portions 604 extend further along the width than the intersink portions 605 without contacting any of the busbars 138. For example, the ratio of the extension of the heatsink portions 604 along the width to the extension of the intersink portions 605 in the same direction may be at least 2:1, at least 5:1, at least 10:1, at least 25:1, at least 50:1, or even at least 100:1.

Figure 6E:
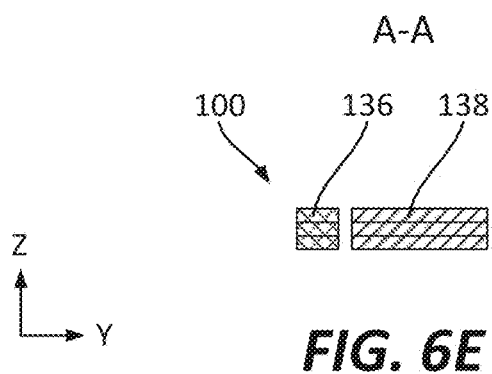
FIGS. 6E and 6F are schematic cross-sectional side views of the portion of a flexible interconnect circuit shown in FIG. 6D, in accordance with some examples.
Figure 6F:
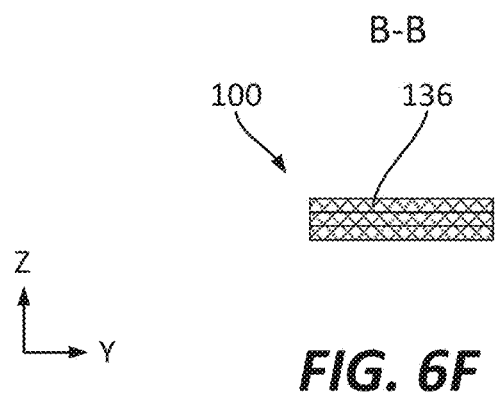

The heatsink portion 604 and intersink portion 605 both transfer electric current. Specifically, the heatsink portion 604 transfers an electric current $I_A$ and the intersink portion 605 transfers an electric current $I_B$, and $I_A$ and $I_B$ are equal. FIG. 6E is a schematic cross-sectional side view of multilayered flexible interconnect circuit 100, along line A-A of FIG. 6D. In FIG. 6E, high-current conductor 136 and busbar 138 are both shown. FIG. 6F is a schematic cross-sectional side view of multilayered flexible interconnect circuit 100, along line B-B of FIG. 6D. In FIG. 6F, no busbar 138 is included. As shown in FIG. 6E, the cross-section of high-current conductor 136 in the intersink portion 605 is smaller than its cross-section in heatsink portion 604, as shown in FIG. 6F. The electrical resistance of the high-current conductor 136 is higher in the intersink portion 605 than in the heatsink portion 604. Returning to FIG. 6D, the current density, $J_B$, and the resistive heat generated by the transfer of electric current is also higher in intersink portion 605 than the current density, $J_A$, and resistive heat generated in heatsink portion 604. The high thermal conductivity of the metal of the high-current conductor 136 allows heat generated in the intersink portion 605 to flow to the heatsink portion 604. The higher surface area to volume ratio of the heatsink portion 604 allows the heat to more readily radiate from the heatsink portion 604 than from the intersink portion 605. In this way, the heatsink portion 604 allows the high-current conductor 136 to transfer higher electrical currents than would be possible by a high-current conductor 136 lacking a heatsink portion 604. As illustrated in FIG. 6D, the multilayered flexible interconnect circuit 100 may comprise multiple heatsink portions 604.

Figure 7A:
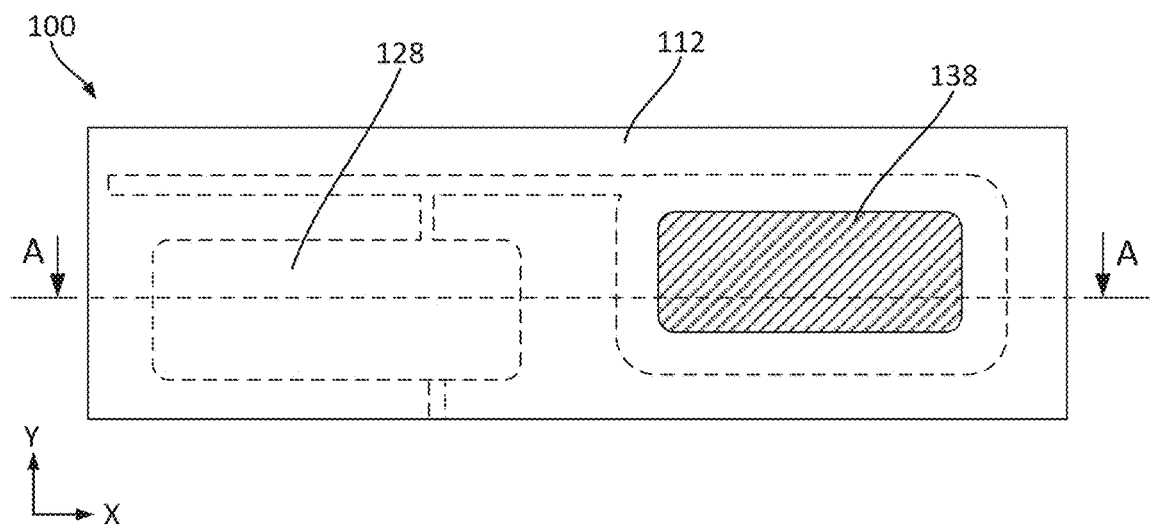
FIGS. 7A and 7B are schematic top and side views of a multilayered flexible interconnect circuit illustrating a capacitor being formed using two conductive layers and an inner insulator layer, extending between the two conductive layers, in accordance with some examples.
Figure 7B:
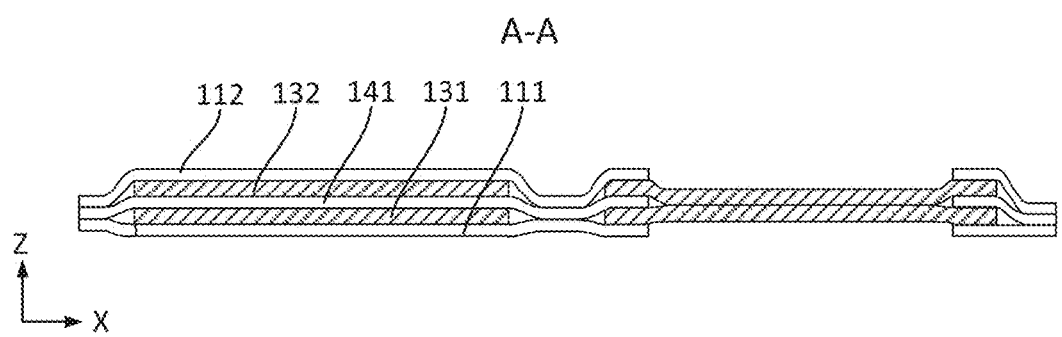

FIGS. 7A-7B: Examples of Integrated Capacitors

FIGS. 7A and 7B are schematic top and side views of a multilayered flexible interconnect circuit 100 illustrating an integrated capacitor 128 being formed using two conductive layers (e.g., a first conductive layer 131 and a second conductive layer 132) and an inner insulator layer 141, extending between the two conductive layers, in accordance with some examples. Similar to vent-channel forming metal portions 135 and high-current conductors 136 described above, an integrated capacitor 128 is formed from otherwise available conductive layer portions (e.g., portions not used to form any other conductive components 130), which may be referred to as "dead metal islands". The electrical connection of the dead metal islands in parallel with sensitive components can provide a degree of electrostatic discharge (ESD) protection to these components.

Figure 8:
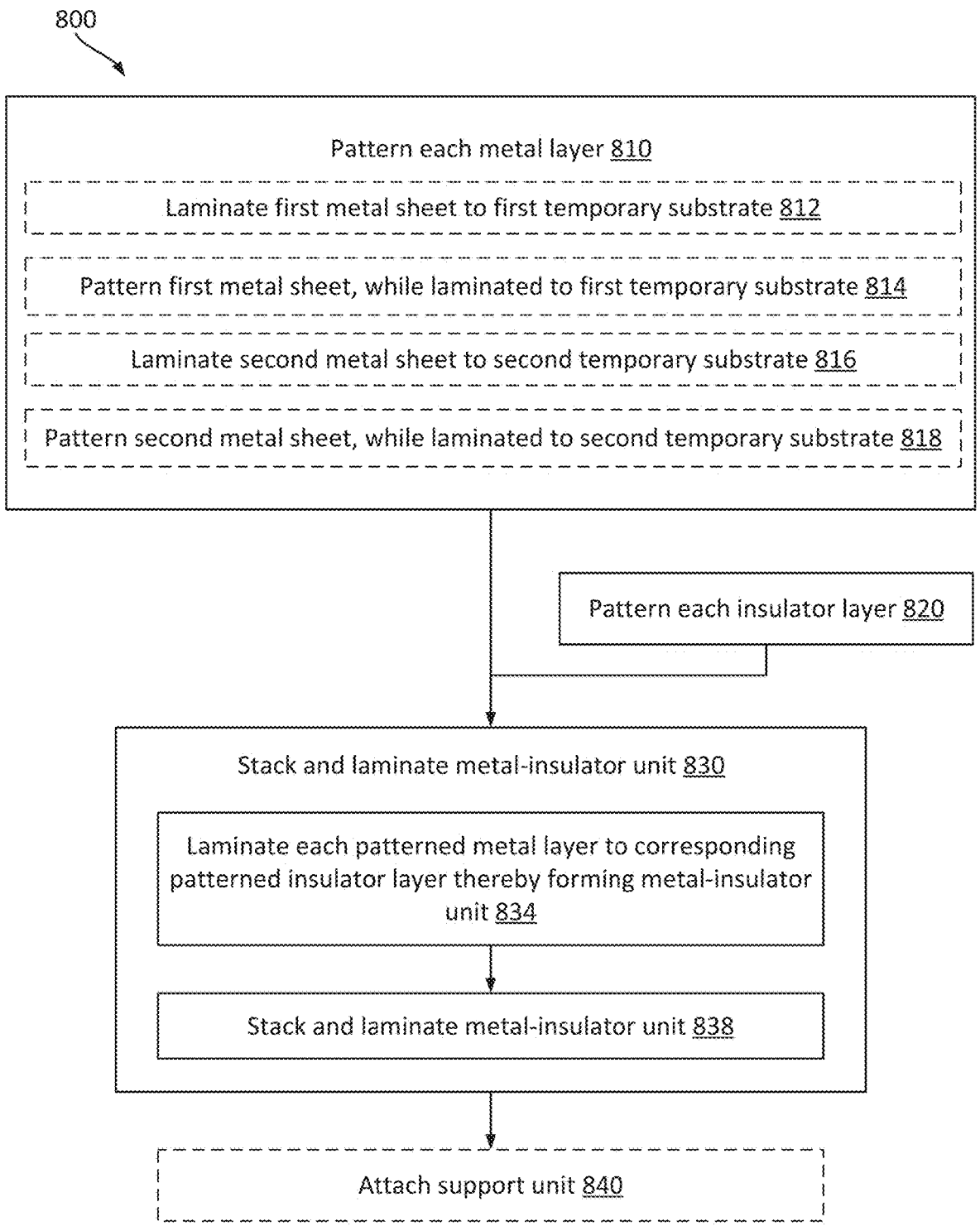
FIG. 8 is a process flowchart corresponding to a method of fabricating a multilayered flexible interconnect circuit, in accordance with some examples.

FIG. 8: Examples of Methods of Fabricating Flexible Interconnect Circuits

FIG. 8 is a process flowchart corresponding to method 800 of fabricating a flexible interconnect circuit 100, in accordance with some examples. Various examples and features of multilayered flexible interconnect circuits 100 are described above. Specifically, a multilayered flexible interconnect circuit 100 comprises at least two conductive layers, e.g., a first conductive layer 131 and a second conductive layer 132. These conductive layers can have different patterns to provide various features described above. Furthermore, the multilayered flexible interconnect circuit 100 also comprises a first outer insulator layer 111, a second outer insulator layer 112, and an inner insulator layer 141 that is used to support and, in some parts, to insulate the first conductive layer 131 and the second conductive layer 132.

Method 800 may comprise (block 810) patterning each conductive layer and, separately, (block 820) patterning each insulator layer. In fact, each layer of a multilayered flexible interconnect circuit 100 can be patterned individually prior to laminating these layers together. In some examples, various temporary substrates may be used for these patterning operations. A temporary substrate can be used to support the patterned layer during and after the patterning operation. The temporary substrate is removed when the patterned layers are stacked.

As such, in some examples, method 800 or, more specifically, (block 810) patterning each conductive layer comprises (block 812) laminating a first metal sheet to a first temporary substrate and (block 814) patterning the first metal sheet, while the first metal sheet remains laminated on the first temporary substrate thereby forming a first conductive layer 131. For example, initially, the metal sheet may be a continuous self-supporting metal foil that can be processed and handled without any additional support. The pattern of the first conductive layer 131 may include disjoined components (e.g., busbar portions), narrow conductive traces, and/or other features that can be self-supported. Unlike, the first conductive layer 131, the temporary substrate is not patterned (e.g., the temporary substrate may remain as a continuous sheet). In some examples, the same temporary substrate may support multiple instances of first conductive layers 131 (e.g., used for the production of multiple units of multilayered flexible interconnect circuits 100). Various patterning techniques are within the scope. For example, conductive layers can be patterned using chemical etching, mechanical cutting, laser cutting, and the like.

Similarly, method 800 or, more specifically, (block 810) patterning each conductive layer comprises (block 816) laminating a second metal sheet to a second temporary substrate and (block 818) patterning the second metal sheet to a second temporary substrate thereby forming a second conductive layer 132. It should be noted that the pattern of the first conductive layer 131 is different from the pattern of the second conductive layer 132. For example, a busbar (formed by both conductive layers) may have only one conductive layer protruding away and forming a voltage trace.

Method 800 may also comprise (block 820) patterning one or more insulator layers to form various openings. These openings (in the outer insulator layers) are used to provide access to the conductive layers at some locations (e.g., busbars). Furthermore, the openings in inner insulator layers allow the interconnection of the conductive layers at some locations (e.g., busbars). In some examples, after patterning insulator layers, at least one insulator represents a continuous structure (that is able to self-support and does not require any additional structures).

Method 800 further comprises (block 830) stacking and laminating the first conductive layer 131, second conductive layer 132, first outer insulator layer 111, second outer insulator layer 112, and inner insulator layer 141 thereby forming a flexible interconnect circuit 100. In some examples, this stacking and laminating operation comprises (block 834) laminating the first conductive layer 131 to a first outer insulator layer 111 and/or inner insulator layer 141 and removing any temporary support from the first conductive layer 131. After laminating to one or both of the insulator layers, the first conductive layer 131 is supported by one or both of the insulator layers and the temporary support is no longer needed. Similarly, the second conductive layer 132 may be laminated to a second outer insulator layer 112 and/or inner insulator layer 141 and remove any temporary support from the second conductive layer 132. A combination of a patterned conductive layer (e.g., a first conductive layer 131, a second conductive layer 132) and one or two insulators laminated to this patterned conductive layer may be referred to as a metal-insulator unit. Forming these insulator units prior to forming a full stack of the multilayered flexible interconnect circuit 100 allows the removal of any temporary substrates. Method 800 then proceeds with (block 838) stacking and laminating these metal-insulator units, each comprising at least one patterned conductive layer. In some examples, a patterned conductive layer comprises two patterned conductive layers, e.g., an inner insulator layer 141 with a first conductive layer 131 laminated to one side and a second conductive layer 132 laminated to the other side.

In some examples, method 800 comprises (block 840) attaching a support unit 150, e.g., to a first outer insulator layer 111. For example, a support unit 150 may have an adhesive layer interfacing the first outer insulator layer 111 during this operation. Additional features of the support unit 150 are described above.

Figure 9:
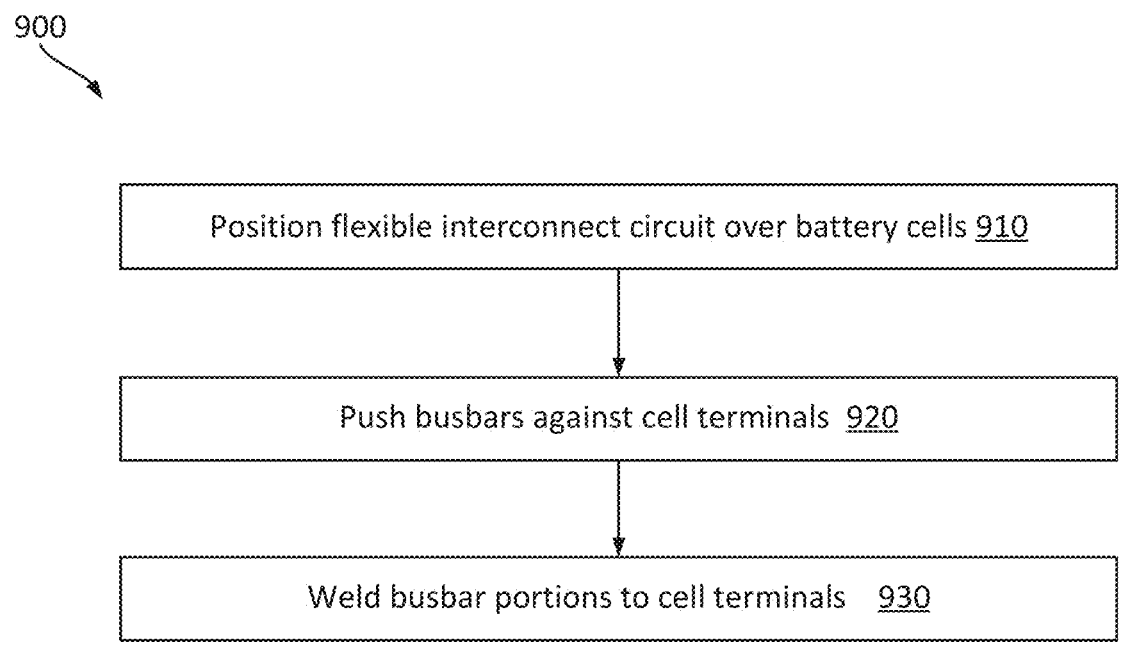
FIG. 9 is a process flowchart corresponding to a method of fabricating a battery pack using a multilayered flexible interconnect circuit, in accordance with some examples.

FIG. 9: Examples of Methods of Fabricating Battery Assemblies Comprising Flexible Interconnect Circuits FIG. 9 is a process flowchart corresponding to method 900 of fabricating a battery assembly 180, in accordance with some examples. A battery assembly 180 may be also referred to as a battery module or a battery pack and comprises multiple battery cells 190 and a multilayered flexible interconnect circuit 100 interconnecting these battery cells 190 and, in some examples, providing additional functionality (e.g., voltage traces, vent channels, and the like).

Method 900 comprises (block 910) positioning a multilayered flexible interconnect circuit 100 over a set of battery cells 190. As shown in FIG. 1A, the battery cells 190 comprise cell terminals 192. The busbar portions 102 of the multilayered flexible interconnect circuit 100 are positioned over the cell terminals 192 during this operation. Various alignment features can be provided on the multilayered flexible interconnect circuit 100 to enable this operation. In some examples, a battery-facing component of the multilayered flexible interconnect circuit 100 (e.g., a support unit 150 or a first outer insulator layer 91) is also bonded to the battery cells 190 (e.g., using an adhesive layer such as a double-sided PSA).

Method 900 proceeds with (block 920) pushing the busbar portion 102 toward the cell terminals 192 to establish direct contact between the busbar portion 102 (or, more specifically, the first conductive layer 131 of the busbar portion 102) and the cell terminals 192. In some examples, this pushing operation requires a substantial out-of-plane deflection of the busbar portion 102 relative to other portions of the multilayered flexible interconnect circuit 100. Various features of the busbar support portion 104 enable this out-of-plane deflection as further described above.

Method 900 proceeds with (block 930) welding the busbar portion 102 to the cell terminals 192, e.g., using laser welding. However, other welding techniques are within the scope. It should be noted that when the busbar portion 102 to the cell terminal 192, all conductive layers forming the busbar portion 102 are also welded to each other.

Examples of Battery Assemblies with Multilayered Flexible Interconnect Circuits

FIG. 1E as well as other figures discussed above illustrate some examples and aspects of a battery assembly 180 fabricated using a multilayered flexible interconnect circuit 100. In some examples, a battery assembly 180 comprises battery cells 190 (e.g., forming a set of battery cells) comprising cell terminals 192 and a multilayered flexible interconnect circuit 100 comprising a first outer insulator layer 111, a second outer insulator layer 112, an inner insulator layer 141, a first conductive layer 131, and a second conductive layer 132. Various examples of the multilayered flexible interconnect circuit 100 are described above. Specifically, the first outer insulator layer 111, the second outer insulator layer 112, the inner insulator layer 141, the first conductive layer 131, and the second conductive layer 132 collectively define a busbar portion 102, a busbar support portion 104, an insulated conductor portion 106, and a metal-free portion 108 of the flexible interconnect circuit 100.

In the busbar portion 102, the first conductive layer 131 and the second conductive layer 132 directly interface with each other, and both are welded to the cell terminals 192 of two adjacent battery cells of the battery cells 190. Furthermore, in the busbar portion 102, a surface of the first conductive layer 131 facing away from the second conductive layer 132 interfaces with the cell terminals 192 of the two adjacent battery cells of the battery cells 190.

In the busbar support portion 104, the inner insulator layer 141 is stacked between and directly interfaces with each of the first conductive layer 131 and the second conductive layer 132. Furthermore, in the busbar support portion 104, the first conductive layer 131 is stacked between and directly interfaces the first outer insulator layer 111 and the inner insulator layer 141. Finally, in the busbar support portion 104, the second conductive layer 132 is stacked between and directly interfaces the inner insulator layer 141 and the second outer insulator layer 112.

In some examples, the busbar portion 102 is positioned out-of-plane and closer to the cell terminals 192 than the metal-free portion 108.

CONCLUSION

It is to be understood that the above description is intended to be illustrative, and not restrictive. For example, the above-described examples (and/or aspects thereof) may be used in combination with each other. In addition, many modifications may be made to adapt a particular situation or material to the teachings presented herein. Dimensions, types of materials, orientations of the various components, and the number and positions of the various components described herein are intended to define parameters of some examples and are by no means limiting and are merely examples. Many examples and modifications within the spirit and scope of the claims will be apparent to those of skill in the art upon reviewing the above description.

The invention claimed is:

1. A multilayered flexible interconnect circuit comprising:
a first outer insulator layer;
a second outer insulator layer;
an inner insulator layer;
a first conductive layer; and
a second conductive layer, wherein:
the first outer insulator layer, the second outer insulator layer, the inner insulator layer, the first conductive layer, and the second conductive layer collectively define a busbar portion, a busbar support portion, an insulated conductor portion, and a metal-free portion of the flexible interconnect circuit,
in the busbar portion, the first conductive layer and the second conductive layer directly interface with each other while a surface of the first conductive layer facing away from the second conductive layer is exposed,
in the busbar support portion, the inner insulator layer is stacked between and directly interfaces each of the first conductive layer and the second conductive layer,
in the busbar support portion, the first conductive layer is stacked between and directly interfaces the first outer insulator layer and the inner insulator layer,
in the busbar support portion, the second conductive layer is stacked between and directly interfaces the inner insulator layer and the second outer insulator layer, and
each of the first conductive layer and the second conductive layer comprises aluminum and has a thickness of 100-400 micrometers.

2. A multilayered flexible interconnect circuit comprising:
a first outer insulator layer;
a second outer insulator layer;
an inner insulator layer;
a first conductive layer; and
a second conductive layer, wherein:
the first outer insulator layer, the second outer insulator layer, the inner insulator layer, the first conductive layer, and the second conductive layer collectively define a busbar portion, a busbar support portion, an insulated conductor portion, and a metal-free portion of the flexible interconnect circuit,
in the busbar portion, the first conductive layer and the second conductive layer directly interface with each other while a surface of the first conductive layer facing away from the second conductive layer is exposed,
in the busbar support portion, the inner insulator layer is stacked between and directly interfaces each of the first conductive layer and the second conductive layer,
in the busbar support portion, the first conductive layer is stacked between and directly interfaces the first outer insulator layer and the inner insulator layer,
in the busbar support portion, the second conductive layer is stacked between and directly interfaces the inner insulator layer and the second outer insulator layer, and
in the metal-free portion, the inner insulator layer is stacked between and directly interfaces the first outer insulator layer and the second outer insulator layer.

3. The multilayered flexible interconnect circuit of claim 2, wherein, in the insulated conductor portion:
the second conductive layer is stacked between and directly interfaces the inner insulator layer and the second outer insulator layer, and
the inner insulator layer is stacked between and directly interfaces the second conductive layer and the first outer insulator layer.

4. The multilayered flexible interconnect circuit of claim 3, wherein the insulated conductor portion is positioned between the busbar support portion and metal-free portion.

5. The multilayered flexible interconnect circuit of claim 1, wherein the busbar support portion at least partially surrounds the busbar portion.

6. The multilayered flexible interconnect circuit of claim 1, wherein the busbar support portion is positioned between the busbar portion and the metal-free portion.

7. A multilayered flexible interconnect circuit comprising:
a first outer insulator layer;
a second outer insulator layer;
an inner insulator layer;
a first conductive layer; and
a second conductive layer, wherein:
the first outer insulator layer, the second outer insulator layer, the inner insulator layer, the first conductive layer, and the second conductive layer collectively define a busbar portion, a busbar support portion, an insulated conductor portion, and a metal-free portion of the flexible interconnect circuit,
in the busbar portion, the first conductive layer and the second conductive layer directly interface with each other while a surface of the first conductive layer facing away from the second conductive layer is exposed,
in the busbar support portion, the inner insulator layer is stacked between and directly interfaces each of the first conductive layer and the second conductive layer,
in the busbar support portion, the first conductive layer is stacked between and directly interfaces the first outer insulator layer and the inner insulator layer,
in the busbar support portion, the second conductive layer is stacked between and directly interfaces the inner insulator layer and the second outer insulator layer, and
each of the first outer insulator layer, the second outer insulator layer, the inner insulator layer, the first conductive layer, and the second conductive layer is formed from a same starting sheet.

8. A multilayered flexible interconnect circuit comprising:
a first outer insulator layer;
a second outer insulator layer;
an inner insulator layer;
a first conductive layer; and
a second conductive layer, wherein:
the first outer insulator layer, the second outer insulator layer, the inner insulator layer, the first conductive layer, and the second conductive layer collectively define a busbar portion, a busbar support portion, an insulated conductor portion, and a metal-free portion of the flexible interconnect circuit,
in the busbar portion, the first conductive layer and the second conductive layer directly interface with each other while a surface of the first conductive layer facing away from the second conductive layer is exposed, in the busbar support portion, the inner insulator layer is stacked between and directly interfaces each of the first conductive layer and the second conductive layer, in the busbar support portion, the first conductive layer is stacked between and directly interfaces the first outer insulator layer and the inner insulator layer, in the busbar support portion, the second conductive layer is stacked between and directly interfaces the inner insulator layer and the second outer insulator layer, and each of the first outer insulator layer, the second outer insulator layer, the inner insulator layer, the first conductive layer, and the second conductive layer has the same thickness and composition throughout an entire footprint of the flexible interconnect circuit.

9. A multilayered flexible interconnect circuit comprising:
a first outer insulator layer;
a second outer insulator layer;
an inner insulator layer;
a first conductive layer; and
a second conductive layer, wherein:
the first outer insulator layer, the second outer insulator layer, the inner insulator layer, the first conductive layer, and the second conductive layer collectively define a busbar portion, a busbar support portion, an insulated conductor portion, and a metal-free portion of the flexible interconnect circuit,
in the busbar portion, the first conductive layer and the second conductive layer directly interface with each other while a surface of the first conductive layer facing away from the second conductive layer is exposed,
in the busbar support portion, the inner insulator layer is stacked between and directly interfaces each of the first conductive layer and the second conductive layer,
in the busbar support portion, the first conductive layer is stacked between and directly interfaces the first outer insulator layer and the inner insulator layer,
in the busbar support portion, the second conductive layer is stacked between and directly interfaces the inner insulator layer and the second outer insulator layer, and
each of the first outer insulator layer, the second outer insulator layer, and the inner insulator layer has an opening in the busbar portion.

10. A multilayered flexible interconnect circuit comprising:
a first outer insulator layer;
a second outer insulator layer;
an inner insulator layer;
a first conductive layer; and
a second conductive layer, wherein:
the first outer insulator layer, the second outer insulator layer, the inner insulator layer, the first conductive layer, and the second conductive layer collectively define a busbar portion, a busbar support portion, an insulated conductor portion, and a metal-free portion of the flexible interconnect circuit,
in the busbar portion, the first conductive layer and the second conductive layer directly interface with each other while a surface of the first conductive layer facing away from the second conductive layer is exposed, in the busbar support portion, the inner insulator layer is stacked between and directly interfaces each of the first conductive layer and the second conductive layer, in the busbar support portion, the first conductive layer is stacked between and directly interfaces the first outer insulator layer and the inner insulator layer, in the busbar support portion, the second conductive layer is stacked between and directly interfaces the inner insulator layer and the second outer insulator layer, each of the first outer insulator layer and the second outer insulator layer comprises a polymer base and an adhesive layer covering a surface of and supported by the polymer base, the polymer base comprises one or more polymers selected from the group consisting of polyimide (PI), polyethylene naphthalate (PEN), polyethylene terephthalate (PET), polymethyl methacrylate (PMMA), ethyl vinyl acetate (EVA), polyethylene (PE), polyvinyl fluoride (PVF), polyamide (PA), and/or polyvinyl butyral (PVB), and the adhesive layer comprises one or more of epoxy and polyurethane.

11. The multilayered flexible interconnect circuit of claim 10, wherein, in the busbar support portion:
the adhesive layer of the first outer insulator layer directly interfaces and is adhered to the first conductive layer, and
the adhesive layer of the second outer insulator layer directly interfaces and is adhered to the second conductive layer.

12. A multilayered flexible interconnect circuit comprising:
a first outer insulator layer;
a second outer insulator layer;
an inner insulator layer;
a first conductive layer; and
a second conductive layer, wherein:
the first outer insulator layer, the second outer insulator layer, the inner insulator layer, the first conductive layer, and the second conductive layer collectively define a busbar portion, a busbar support portion, an insulated conductor portion, and a metal-free portion of the flexible interconnect circuit,
in the busbar portion, the first conductive layer and the second conductive layer directly interface with each other while a surface of the first conductive layer facing away from the second conductive layer is exposed,
in the busbar support portion, the inner insulator layer is stacked between and directly interfaces each of the first conductive layer and the second conductive layer,
in the busbar support portion, the first conductive layer is stacked between and directly interfaces the first outer insulator layer and the inner insulator layer,
in the busbar support portion, the second conductive layer is stacked between and directly interfaces the inner insulator layer and the second outer insulator layer,
the inner insulator layer comprises an inner polymer base, a first inner adhesive layer, and a second inner adhesive layer, the inner polymer base is positioned between and supports each of the first inner adhesive layer and the second inner adhesive layer, the inner polymer base comprises one or more polymers selected from the group consisting of polyimide (PI), polyethylene naphthalate (PEN), polyethylene terephthalate (PET), polymethyl methacrylate (PMMA), ethyl vinyl acetate (EVA), polyethylene (PE), polyvinyl fluoride (PVF), polyamide (PA), and/or polyvinyl butyral (PVB), and each of the first inner adhesive layer and the second inner adhesive layer comprises one or more of epoxy and polyurethane.

13. The multilayered flexible interconnect circuit of claim 12, wherein, in the busbar support portion:

the first inner adhesive layer of the inner insulator layer directly interfaces and is adhered to the first conductive layer, and the adhesive layer of the second outer insulator layer directly interfaces and is adhered to the second conductive layer.

14. A multilayered flexible interconnect circuit comprising:

a first outer insulator layer;
a second outer insulator layer;
an inner insulator layer;
a first conductive layer;
a second conductive layer, and
a support unit adhered to the first outer insulator layer and comprising a busbar access opening, wherein:

the first outer insulator layer, the second outer insulator layer, the inner insulator layer, the first conductive layer, and the second conductive layer collectively define a busbar portion, a busbar support portion, an insulated conductor portion, and a metal-free portion of the flexible interconnect circuit, in the busbar portion, the first conductive layer and the second conductive layer directly interface with each other while a surface of the first conductive layer facing away from the second conductive layer is exposed, in the busbar support portion, the inner insulator layer is stacked between and directly interfaces each of the first conductive layer and the second conductive layer, in the busbar support portion, the first conductive layer is stacked between and directly interfaces the first outer insulator layer and the inner insulator layer, in the busbar support portion, the second conductive layer is stacked between and directly interfaces the inner insulator layer and the second outer insulator layer, and the busbar portion fully overlaps with the support unit.

15. A multilayered flexible interconnect circuit comprising:

a first outer insulator layer;
a second outer insulator layer;
an inner insulator layer;
a first conductive layer; and
a second conductive layer, wherein:

the first outer insulator layer, the second outer insulator layer, the inner insulator layer, the first conductive layer, and the second conductive layer collectively define a busbar portion, a busbar support portion, an insulated conductor portion, and a metal-free portion of the flexible interconnect circuit, in the busbar portion, the first conductive layer and the second conductive layer directly interface with each other while a surface of the first conductive layer facing away from the second conductive layer is exposed, in the busbar support portion, the inner insulator layer is stacked between and directly interfaces each of the first conductive layer and the second conductive layer, in the busbar support portion, the first conductive layer is stacked between and directly interfaces the first outer insulator layer and the inner insulator layer, in the busbar support portion, the second conductive layer is stacked between and directly interfaces the inner insulator layer and the second outer insulator layer, and the first outer insulator layer and second outer insulator layer comprise a set of flexibility slits in the metal-free portion surrounding the busbar support portion thereby providing out-of-plane flexibility of the busbar portion.

16. A multilayered flexible interconnect circuit comprising:

a first outer insulator layer;
a second outer insulator layer;
an inner insulator layer;
a first conductive layer;
a second conductive layer, and
a registration portion comprising:

a first registration opening in the second outer insulator layer; and a second registration opening in the second conductive layer, wherein:

the first outer insulator layer, the second outer insulator layer, the inner insulator layer, the first conductive layer, and the second conductive layer collectively define a busbar portion, a busbar support portion, an insulated conductor portion, and a metal-free portion of the flexible interconnect circuit, in the busbar portion, the first conductive layer and the second conductive layer directly interface with each other while a surface of the first conductive layer facing away from the second conductive layer is exposed, in the busbar support portion, the inner insulator layer is stacked between and directly interfaces each of the first conductive layer and the second conductive layer, in the busbar support portion, the first conductive layer is stacked between and directly interfaces the first outer insulator layer and the inner insulator layer, in the busbar support portion, the second conductive layer is stacked between and directly interfaces the inner insulator layer and the second outer insulator layer, a dimension of the first registration opening in a direction is larger than a dimension of the second registration opening in the same direction, the first registration opening and the second registration opening are aligned, a portion of the second conductive layer is visible through the first registration opening, and a portion of an insulator layer other than the second outer insulator layer is visible through the second registration opening.

17. The multilayered flexible interconnect circuit of claim 16, wherein the portion of an insulator layer other than the second outer insulator layer visible through the second registration opening is a portion of the inner insulator layer.

18. A multilayered flexible interconnect circuit comprising:
- a first outer insulator layer;
- a second outer insulator layer;
- an inner insulator layer;
- a first conductive layer;
- a second conductive layer, and
- at least one high-current conductor comprising at least two conductive layers that directly interface one another, wherein:
  - the first outer insulator layer, the second outer insulator layer, the inner insulator layer, the first conductive layer, and the second conductive layer collectively define a busbar portion, a busbar support portion, an insulated conductor portion, and a metal-free portion of the flexible interconnect circuit,
  - in the busbar portion, the first conductive layer and the second conductive layer directly interface with each other while a surface of the first conductive layer facing away from the second conductive layer is exposed,
  - in the busbar support portion, the inner insulator layer is stacked between and directly interfaces each of the first conductive layer and the second conductive layer,
  - in the busbar support portion, the first conductive layer is stacked between and directly interfaces the first outer insulator layer and the inner insulator layer,
  - in the busbar support portion, the second conductive layer is stacked between and directly interfaces the inner insulator layer and the second outer insulator layer, and
  - the at least one high-current conductor is electrically unconnected with the conductive layers in the busbar portion.

19. The multilayered flexible interconnect circuit of claim 18, wherein the high-current conductor comprises at least one heatsink portion and at least one intersink portion, wherein:
- the heatsink portion and intersink portion are monolithic,
- the heatsink portion extends further in a width than the intersink portion, and
- a ratio of an extension of the heatsink portion in the width to an extension of the intersink portion in the same direction is at least 10:1.

20. The multilayered flexible interconnect circuit of claim 1, further comprising a low-current carrying conductive component formed from fewer than all of the conductive layers and monolithic with a portion of the conductive layer that forms both this low-current carrying conductive component and a portion of the busbar portion.

* * * * *